US012703035B2

(12) United States Patent
Ward et al.

(10) Patent No.: US 12,703,035 B2
(45) Date of Patent: Aug. 11, 2026

(54) MULTI-EDGE OSCILLATING SAW BLADE

(71) Applicant: William Zachary Ward, Covington, GA (US)

(72) Inventors: William Zachary Ward, Covington, GA (US); Mark Anderson Wilson, Winder, GA (US)

(73) Assignee: William Ward, Covington, GA (US)

( * ) Notice: Subject to any disclaimer, the term of this patent is extended or adjusted under 35 U.S.C. 154(b) by 329 days.

(21) Appl. No.: 18/090,751

(22) Filed: Dec. 29, 2022

(65) Prior Publication Data

US 2023/0139730 A1 May 4, 2023

Related U.S. Application Data

(63) Continuation-in-part of application No. 29/797,192, filed on Jun. 29, 2021, now Pat. No. Des. 1,061,191.

(51) Int. Cl.
*B23D 61/00* (2006.01)
*B23D 61/12* (2006.01)

(52) U.S. Cl.
CPC ......... *B23D 61/006* (2013.01); *B23D 61/123* (2013.01)

(58) Field of Classification Search
CPC .... B23D 61/006; B23D 61/028; B27B 19/006
See application file for complete search history.

(56) References Cited

U.S. PATENT DOCUMENTS 5,306,285 A * 4/1994 Miller .................. B23D 61/123 606/177
D693,193 S 11/2013 Bozic
(Continued)

FOREIGN PATENT DOCUMENTS

DE 102011103880 A1 11/2012
DE 102011103880 B4 8/2016
(Continued)

OTHER PUBLICATIONS

"EZARC Oscillating Saw Blades", Amazon.com, site visited Feb. 15, 2024: https://www.amazon.com/EZARC-Oscillating-Multitool-Carbide-Material/dp/B01 MG70GLW/, Oct. 31, 2016, 1 page.
(Continued)

*Primary Examiner* — Jennifer S Matthews
(74) *Attorney, Agent, or Firm* — GTC Law Group PC & Affiliates

(57) ABSTRACT

The present disclosure provides a multi-edge saw blade for use with an oscillating tool that provides multiple cutting edges that can be used sequentially as each cutting edge becomes worn-out or damaged. The multi-edge saw blade includes a first row of cutting teeth arranged across its distal edge and a row of perforations situated across the distal end of the blade and spaced a distance behind the first row of cutting teeth. In some aspects, the multi-edge saw blade further includes at least one additional row of perforations, each situated a spaced distance behind the row of perforations before it. Responsive to a twisting force applied orthogonally to the plane of the blade, each blade edge can be removed from the blade to reveal a fresh row of cutting teeth. The multi-edge saw blade further includes an attachment socket on its proximate end.

27 Claims, 16 Drawing Sheets

(56) References Cited

U.S. PATENT DOCUMENTS

| | | | | |
|---|---|---|---|---|
| D694,077 | S | 11/2013 | Bozic | |
| D694,596 | S | 12/2013 | Davidian et al. | |
| D694,598 | S | 12/2013 | Davidian et al. | |
| 8,915,499 | B2 | 12/2014 | Kaye et al. | |
| D724,923 | S | 3/2015 | Mcroberts et al. | |
| D728,646 | S | 5/2015 | Accola | |
| D750,461 | S | 3/2016 | Mcroberts et al. | |
| 9,527,146 | B2 | 12/2016 | Stoddart et al. | |
| 9,815,187 | B2 | 11/2017 | Kozak | |
| D832,666 | S | 11/2018 | Kaye et al. | |
| 10,293,419 | B2 | 5/2019 | Rubens et al. | |
| D853,817 | S | 7/2019 | Ji | |
| D856,766 | S | 8/2019 | Kaye et al. | |
| D862,185 | S | 10/2019 | Dai | |
| 10,442,020 | B2 | 10/2019 | Dvorak et al. | |
| 10,799,968 | B2 | 10/2020 | Bozic | |
| 2008/0250656 | A1* | 10/2008 | Lewis | B23P 15/28 30/356 |
| 2012/0255417 | A1 | 10/2012 | Frueh et al. | |
| 2015/0135915 | A1 | 5/2015 | Mann | |
| 2016/0257010 | A1* | 9/2016 | Jones | B23D 51/10 |
| 2022/0234124 | A1* | 7/2022 | Elliston | B23D 61/006 |
| 2022/0347772 | A1* | 11/2022 | Butcher | B23D 61/025 |

FOREIGN PATENT DOCUMENTS

| | | | | | |
|---|---|---|---|---|---|
| EP | 1974881 | A2 | | 10/2008 | |
| EP | 1974881 | A3 | | 11/2010 | |
| EP | 1974881 | B1 | | 10/2013 | |
| NZ | 418572-0001 | | | 2/2015 | |
| RU | 2010100343 | A | * | 7/2011 | B23D 61/006 |
| WO | WO-2017127329 | A1 | * | 7/2017 | B26B 1/044 |
| WO | WO-2021016202 | A1 | * | 1/2021 | B23D 61/125 |
| WO | 2024145609 | A1 | | 7/2024 | |

OTHER PUBLICATIONS

FastCap, “Blade Breaker”, Datasheet [online], Retreived From the Internet. May 28, 2022; —Entire Document; DOI: https://web.archive.Org/web/20220528140049/https://www.fastcap.com/product/blade-breaker, 20 pages.

“International Application Serial No. PCT/US2023/086476, International Search Report and Written Opinion mailed Apr. 10, 2024”, Ward, William Zachary (Zach), 20 pages.

“International Application Serial No. PCT/US2023/086476, International Preliminary Report on Patentability mailed Jul. 10, 2025”, Ward, William Zachary (Zach), 8 pages.

* cited by examiner

700

Cutting a material with a first blade of an oscillating tool having a multi-edge saw blade

710

Removing the first blade by applying a perpendicular twisting force, and separating the first blade at a perforating line interposed between the first blade and the second blade

720

Cutting the material with a second blade of the oscillating tool

730

MULTI-EDGE OSCILLATING SAW BLADE

CROSS-REFERENCE TO RELATED APPLICATIONS

This application is a continuation-in-part of U.S. patent application Ser. No. 29/797,192, filed Jun. 29, 2021, and titled "MULTI-BLADE OSCILLATING TOOL", and which is hereby incorporated by reference in its entirety.

BACKGROUND

Any discussion of the related art throughout this specification should in no way be considered as an admission that such art is widely known or forms part of the common general knowledge in the field.

Oscillating tools are used in a variety of applications for sawing, cutting, sanding, polishing, and grinding. Oscillating tools (sometimes called multi-tools) are configured to oscillate various accessory attachments that can be used to saw, cut, sand, polish, or grind a work piece. These accessory attachments are fitted to the oscillating tool by a mechanism that allows the attachment to be moved rapidly (i.e., oscillated) back and forth about an axis of oscillation. For example, an oscillating tool fitted with an offset blade can be used to cut nails or screws flush with a surface. Some oscillating tools allow the accessory attachment to be rotated into different orientations when attached to the tool, allowing, for example, an oscillating blade edge to reach cutting areas that would be unreachable using a rotating or reciprocating saw.

One significant issue with working with oscillating tools is that blade attachments tend to wear out or break during use. When this happens, a blade attachment must be removed from the tool and discarded, then replaced with a new blade attachment before work can continue. Further, the user may continue to use the worn or damaged blade to delay replacement, which may result in substandard work being performed with the worn or damaged tool. The replacement process can result in wasted time as work must be stopped, the blade attachment removed from the oscillating tool, a new blade attachment procured, and then secured to the tool. Such a system can also result in wasted monetary and material resources as the entire blade attachment must be discarded whenever the blade edge is worn out or damaged.

SUMMARY

The present disclosure provides a multi-edge saw blade for use with an oscillating tool that provides multiple cutting edges that can be used sequentially as each cutting edge becomes worn-out or damaged.

In some aspects of the present disclosure, the techniques described herein relate to a multi-edge saw blade for use in an oscillating tool comprising a proximal end that includes an attachment socket configured to mate with an oscillating drive member of a power tool and oscillate about an axis of oscillation. This multi-edge saw blade further includes a distal end generally in a plane and having a distal edge formed into a first cutting edge that includes a first row of cutting teeth situated across the distal edge. This multi-edge saw blade further includes at least one row of perforations a spaced distance behind the first row of cutting teeth, wherein each of the at least one row of perforations realizes at least one breakaway line and at least one additional cutting edge including at least one additional row of cutting teeth. Further, each of the at least one row of perforations is sized and shaped such that responsive to a force applied orthogonally to the plane of the distal end of the multi-edge saw blade, a portion of the distal end between the first row of cutting teeth and the row of perforations nearest the distal edge breaks away from the multi-edge saw blade revealing an additional cutting edge.

In some aspects of the present disclosure, the techniques described herein relate to a multi-edge saw blade for use in an oscillating tool comprising a proximal end that includes an attachment socket configured to mate with an oscillating drive member of a power tool and oscillate about an axis of oscillation. This multi-edge saw blade further includes a distal end having a distal edge formed into a first cutting edge that includes a first row of cutting teeth situated across the distal edge and at least one row of perforations a spaced distance behind the first row of cutting teeth, wherein each of the at least one row of perforations realizes at least one breakaway line and at least one additional cutting edge including at least one additional row of cutting teeth. Further, each of the at least one row of perforations is sized and shaped such that responsive to a force applied orthogonally to the plane of the distal end of the multi-edge saw blade, a portion of the distal end between the first row of cutting teeth and the row of perforations nearest the distal edge breaks away from the multi-edge saw blade revealing an additional cutting edge.

In some aspects of the present disclosure, the techniques described herein relate to a multi-edge saw blade, wherein the first row of cutting teeth and each additional row of cutting teeth are arranged perpendicular to the axis of oscillation.

In some aspects of the present disclosure, the techniques described herein relate to a multi-edge saw blade, wherein the first row of cutting teeth and each additional row of cutting teeth are arranged at an angle with respect to the axis of oscillation.

In some aspects of the present disclosure, the techniques described herein relate to a multi-edge saw blade, wherein the angle is between 10 degrees and 45 degrees, inclusive.

In some aspects of the present disclosure, the techniques described herein relate to a multi-edge saw blade, wherein the angle is between 10 degrees and 60 degrees, inclusive.

In some aspects of the present disclosure, the techniques described herein relate to a multi-edge saw blade, wherein the first row of cutting teeth and each additional row of cutting teeth are arranged in a curve.

In some aspects of the present disclosure, the techniques described herein relate to a multi-edge saw blade, wherein the curve includes an arc of a circle.

In some aspects of the present disclosure, the techniques described herein relate to a multi-edge saw blade, wherein the curve includes between 30 degrees and 120 degrees of the circle, inclusive.

In some aspects of the present disclosure, the techniques described herein relate to a multi-edge saw blade, wherein the curve is centered on the axis of oscillation.

In some aspects of the present disclosure, the techniques described herein relate to a multi-edge saw blade, wherein the distal end of the multi-edge saw blade includes one row of perforations, and the multi-edge saw blade includes two cutting edges total.

In some aspects of the present disclosure, the techniques described herein relate to a multi-edge saw blade, wherein the distal end of the multi-edge saw blade includes two rows of perforations, and the multi-edge saw blade includes three cutting edges total.

In some aspects of the present disclosure, the techniques described herein relate to a multi-edge saw blade, wherein the distal end of the multi-edge saw blade includes n rows of perforations, and the multi-edge saw blade includes n+1 cutting edges total, where n includes an integer greater than two (2).

In some aspects of the present disclosure, the techniques described herein relate to a multi-edge saw blade, wherein the multi-edge saw blade includes at least one of high carbon steel, stainless steel, a carbon alloy, carbon fiber, high density polyethylene, poly carbonate, thermoset plastic, or high heat epoxy resin.

In some aspects of the present disclosure, the techniques described herein relate to a multi-edge saw blade, wherein the multi-edge saw blade has a thickness within a range of 26 gauge/0.0187 inches to 16 gauge/0.0625 inches, inclusive.

In some aspects of the present disclosure, the techniques described herein relate to a multi-edge saw blade, wherein the multi-edge saw blade has a thickness within a range of 25 gauge/0.0219 inches to 21 gauge/0.0344 inches, inclusive.

In some aspects of the present disclosure, the techniques described herein relate to a multi-edge saw blade, wherein the multi-edge saw blade has a hardness in a range of 42 HRC to 56 HRC, inclusive.

In some aspects of the present disclosure, the techniques described herein relate to a multi-edge saw blade, wherein the multi-edge saw blade has a hardness of 50 HRC.

In some aspects of the present disclosure, the techniques described herein relate to a multi-edge saw blade, wherein the multi-edge saw blade is coated with at least one of ceramic, graphene, molybdenum disulfide coating, fluorinated ethylene propylene, polytetrafluoroethylene, fluoropolymer, or fluoropolymer with Xylan®.

In some aspects of the present disclosure, the techniques described herein relate to a multi-edge saw blade, wherein at least the distal end of the multi-edge saw blade is oxidized to realize a corrosion-resistant surface.

In some aspects of the present disclosure, the techniques described herein relate to a multi-edge saw blade, wherein the first cutting edge and the at least one additional cutting edge each have rows of teeth having a number of teeth and a teeth depth suited for cutting at least one of metal, plastic, wood, or drywall.

In some aspects of the present disclosure, the techniques described herein relate to a multi-edge saw blade, wherein the first cutting edge and the at least one additional cutting edge each have rows of teeth having a number of teeth and a teeth depth suited for cutting at least one of a food product or a material relevant to a medical application.

In some aspects of the present disclosure, the techniques described herein relate to a multi-edge saw blade, wherein the attachment socket is one of a universal socket, a starlock socket, or a supercut socket.

In some aspects of the present disclosure, the techniques described herein relate to a multi-edge saw blade comprises a proximal end that includes an attachment socket configured to mate with an oscillating drive member of a power tool and oscillate about an axis of oscillation. This multi-edge saw blade further comprises a distal end generally in a plane and having a distal edge formed into a first cutting edge that includes a first row of cutting teeth situated across the distal edge and a row of perforations a spaced distance behind the first row of cutting teeth, wherein the row of perforations realizes a breakaway line and an additional cutting edge including an additional row of cutting teeth. Further, each of the row of perforations is sized such that responsive to a force applied orthogonal to the plane of the distal end of the multi-edge saw blade, a portion of the distal end between the first row of cutting teeth and the additional cutting edge breaks away from the multi-edge saw blade revealing the additional cutting edge.

In some aspects of the present disclosure, the techniques described herein relate to a multi-edge saw blade, wherein the first row of cutting teeth and the additional row of cutting teeth are arranged perpendicular to the axis of oscillation.

In some aspects of the present disclosure, the techniques described herein relate to a multi-edge saw blade, wherein the first row of cutting teeth and the additional row of cutting teeth are arranged at an angle with respect to the axis of oscillation.

In some aspects of the present disclosure, the techniques described herein relate to a multi-edge saw blade, wherein the first row of cutting teeth and the additional row of cutting teeth are arranged in a curve.

In some aspects of the present disclosure, the techniques described herein relate to a multi-edge saw blade, wherein the multi-edge saw blade includes at least one of high carbon steel, stainless steel, a carbon alloy, carbon fiber, high density polyethylene, poly carbonate, thermoset plastic, or high heat epoxy resin.

In some aspects of the present disclosure, the techniques described herein relate to a procedure, including an operation comprising cutting a material with a first blade of an oscillating tool having a multi-edge saw blade. The procedure further includes an operation removing the first blade. The procedure further includes cutting the material with a second blade of the oscillating tool.

In some aspects of the present disclosure, the techniques described herein relate to a procedure, wherein the operation of removing the first blade includes applying a perpendicular twisting force, and separating the first blade at a perforating line interposed between the first blade and the second blade.

In some aspects of the present disclosure, the techniques described herein relate to a procedure, wherein the operation removing the first blade includes inserting the multi-edge saw blade into a blade edge removal tool at a selected depth and rotating a snapping member of the blade edge removal tool, thereby separating the first blade from the multi-edge saw blade at a perforating line interposed between the first blade and the second blade.

In some aspects of the present disclosure, the techniques described herein relate to a procedure, wherein the inserting the multi-edge saw blade into the blade edge removal tool at the selected depth includes aligning the perforating line with a slot of the blade edge removal tool.

In some aspects of the present disclosure, the techniques described herein relate to a kit comprising a multi-edge blade that includes a plurality of rows of cutting teeth and a corresponding perforating line interposed between each adjacent row of the plurality of rows of cutting teeth. This kit further comprises a blade edge removal tool that includes a bracing member having a slot configured to permit passing of the multi-edge blade through the bracing member and a snapping member pivotally coupled to the bracing member. Further, within this kit, the blade edge removal tool is configured to apply a perpendicular twisting force to the multi-edge blade in response to a pivoting motion of the snapping member.

In some aspects of the present disclosure, the techniques described herein relate to a kit, wherein the blade edge removal tool further includes a confirmation slot interposed between the bracing member and the snapping member, wherein the confirmation slot includes a shape corresponding to a shape of each perforating line.

In some aspects of the present disclosure, the techniques described herein relate to a kit, wherein the confirmation slot is oriented diagonally relative to a centerline of the multi-edge blade.

In some aspects of the present disclosure, the techniques described herein relate to a kit, wherein the confirmation slot is curved.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures.

DETAILED DESCRIPTION

Figure 1A:
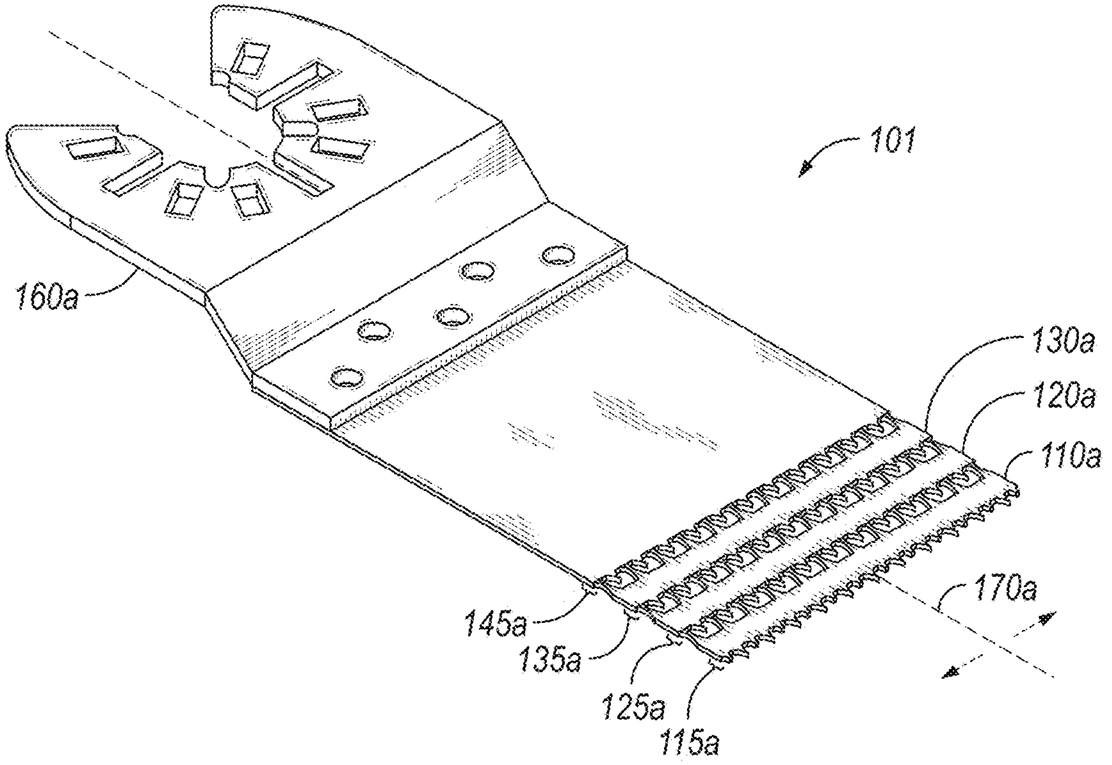
FIG. 1A is a perspective drawing depicting a multi-edge oscillating saw blade according to aspects of the present disclosure with a flat edge that includes three breakaway cutting edges and four cutting edges total.

The present disclosure teaches a multi-edge blade accessory attachment for use with an oscillating tool (or multi-tool) that includes multiple cutting edges arranged sequentially from the distal end of the blade. Within aspects of the present disclosure, these multiple cutting edges are formed such that when a first cutting edge becomes worn out or damaged, it can be broken away from the multi-edge blade in such a way that reveals an additional cutting edge. Under certain aspects of the present disclosure, the multi-edge blade includes a first row of cutting teeth situated across the distal edge of the blade, which realize a first cutting edge. Under aspects of the present disclosure, the multi-edge blade further includes a row of perforations across the distal end of the blade, a spaced distance behind the first row of cutting teeth. Under some aspects of the present disclosure the multi-edge blade further includes at least one additional row of perforations across the distal edge of the blade, with each row of perforations situated a spaced distance behind the row in front of it. Under aspects of the present disclosure the perforations are selectively sized and shaped such as to form a breakaway line. This breakaway line allows the cutting edge in front of a row of perforations to be snapped free of the multi-edge blade by applying a twisting force orthogonal to the plane of the multi-edge blade. Under these aspects of the present disclosure the perforations are selectively sized and shaped such that a new row of cutting teeth will be formed along the new distal edge of the multi-edge blade after a cut-away edge is broken away. In this way, a single multi-edge blade can be attached to an oscillating tool and provide multiple cutting edges, which can be used sequentially without ever removing the blade from the tool.

In some aspects of the present disclosure, the first row of cutting teeth and the one or more rows of perforations are oriented in straight lines substantially perpendicular to an intended axis of oscillation of the multi-edge blade, forming a “flat” blade as shown in FIGS. 1A, 1B, 2A, and 3A. In other aspects of the present disclosure, the first row of cutting teeth and the one or more rows of perforations are oriented in a semi-circular arrangements, forming a “rounded” blade as shown in FIGS. 2B and 3D. In other aspects of the present disclosure, the first row of cutting teeth and the one or more rows of perforations are oriented in a diagonal line with respect to the axis of oscillation, forming an “angled” blade as shown in FIGS. 2C and 3G. Within certain aspects of the present disclosure, the axis of oscillation of the multi-edge blade is oriented along the centerline of the multi-edge blade.

Under certain aspects of the present disclosure, the multi-edge blade further includes an attachment socket on the proximal end of the blade that is configured to mate with an oscillating tool. Certain aspects of the present disclosure further include a cutting edge removal tool, as shown in FIGS. 4A-4D which can be used, in certain applications, to break away worn out or damaged cutting edges from the multi-edge blade. In other aspects of the present disclosure, cutting edges can be removed from the multi-edge blade using a conventional tool (e.g., gripping the cutting edge with a pair of plyers and twisting orthogonal to plane of the blade). It should be noted that within the present disclosure the terms “multi-edge blade,” “multi-edge saw blade,” “multi-edge oscillating saw blade” are used interchangeably to refer the multi-edge blade accessory attachment of the present disclosure. The use of these terms is for ease of explanation, and no limitations should be read into any aspect of the present disclosure with respect to the use of one term over another.

Looking now to FIG. 1A, a first example multi-edge oscillating saw blade 101 for use with an oscillating saw with a flat edge and including three breakaway cutting edges (110_a_, 120_a_, 130_a_) and four cutting edges total is depicted. As shown in FIG. 1A, the multi-edge blade 101 is formed generally in a plane and includes a first row of cutting teeth 115_a_ along the distal edge of the blade. Situated a spaced distance behind first row of cutting teeth 115_a_ is a first row of perforations 125_a_. Similarly, a second row of perforations 135_a_ is situated behind first row of perforations 125_a_, and a third row of perforations 145_a_ is situated behind second row of perforations 135_a_. As multi-edge blade 101 is designed to provide a flat cutting edge, first row of teeth 115_a_ and first, second, and third rows of perforations (125_a_, 135_a_, and 145_a_, respectively) are all oriented in straight lines substantially perpendicular to the axis of oscillation 170_a_.

One of skill in the art will appreciate that the spacing distance between rows of perforations should be selected to provide sufficient room for the teeth to be fully formed in each row, sufficient remaining material to provide sufficient strength for the blade to perform without inadvertent separation of rows of cutting teeth, and to provide sufficient stiffness for the blade to perform the associated task (e.g., cutting on a surface of a suitable material). Certain considerations to determine the spacing distance include: the depth and orientation of the teeth in a cutting row, the material utilized to fabricate the blade, the fabricated thickness of the blade, the material intended for cutting with the blade, the forces applied to the blade during cutting (e.g., down force by the operator, oscillating speed and amplitude, etc.), the intended cutting technique utilized with the blade (e.g., whether torsion forces, perpendicular forces, etc., are expected to be experienced by the blade in use), the total number of connecting portions of the blade between rows of cutting teeth, and/or the number and arrangement of perforations utilized to make sequential rows of cutting teeth easy to remove. It will be understood that the spacing distance between each row of cutting teeth may be the same, or may be varied. For example, where the thickness of the blade material tapers (e.g., thicker at the base toward the attachment socket 160_a_, and thinner toward the distal edge of the blade), the spacing distance may be varied appropriately (e.g., a longer spacing distance to provide additional securing material, and/or a shorter spacing distance to reduce the lever arm applied by incidental forces or strikes on the blade that may tend to cause an inadvertent separation). In another example, the total lever arm and vibration profile of the blade may vary according to which of the rows of cutting teeth is actively in the cutting position, with the spacing distance varied appropriately (e.g., a longer spacing distance for the more distal rows, for example to provide additional securing material, or a shorter spacing distance for the more distal rows, for example to reduce the lever arm and/or to limit the overall length of the blade). In certain embodiments, the spacing distance may be slightly larger than the extent of the teeth in a cutting row, for example with a selected offset distance (e.g., 0.1" greater than the extent of the teeth, 0.5" greater than the extent of the teeth, etc.), and/or at a selected ratio (spacing distance:teeth extent) such as 1.05, 1.10, 1.5, 3.0, etc. In certain embodiments, the spacing distance may be selected to provide sufficient connecting material volume (e.g., the connecting material between cutting rows), and/or to provide an appropriate lever arm to keep removal operations for cutting rows within selected force boundaries (e.g., high enough to avoid inadvertent removal, and low enough to provide for convenient removal). It can be seen that, for embodiments that include and/or are configured to utilize a blade edge removal tool, the spacing distance may be configured to cooperate with the blade edge removal tool—for example providing spacing such that sequential rows engage the removal tool properly and/or consistently, and/or allowing for a greater removal force due to the assistance and predictability provided by the removal tool.

Each of the perforations in the rows of perforations 125_a_, 135_a_, and 145_a_ are selectively sized and shaped to provide, without limitation, one or more of three functions. First, each row of perforations 125_a_, 135_a_, and 145_a_ forms a breakaway line, which allows the portion of the distal end directly in front of each row of perforations to be cleanly broken away responsive to a twisting force applied orthogonally to the plane of the multi-edge blade 101. Second, the size and shape of the perforations is selected such that the structural integrity of the multi-edge blade remains intact when the multi-edge saw blade is in use. That is, under use in a sawing or cutting operation, the perforations are sized and shaped such that the saw blade remains rigid (and/or with controlled flexibility), and the outermost cutting edge remains securely attached to the main body of the blade. Third, each perforation is shaped such that after the cutting edge before its row is broken away, the remaining material will form a new row of cutting teeth across the new distal edge of the multi-edge blade. The removal operation is explained in more detail with respect to FIGS. 2A and 3A-3C below. As the example multi-edge blade 101 of FIG. 1A includes three rows of perforations (125*a*, 135*a*, and 145*a*, respectively), the blade effectively includes four separate cutting edges, which can be used sequentially by breaking off (or "snapping off") each leading cutting edge as it becomes worn or damaged. As will be discussed in more detail with respect to FIGS. 5A and 5B, according aspects of the present disclosure, each cutting edge can be removed from the multi-edge blade without removing the blade from the oscillating tool to which it is attached.

The proximate end of the multi-edge saw blade 101 includes an attachment socket 160*a* which can be used to fix or secure the blade to the oscillating drive member of an electric oscillating power tool. Within FIG. 1A, the attachment socket 160*a* is depicted as a universal (or "open anchor") type socket. However, the methods of the present disclosure are not limited in this regard. Indeed, the attachment socket 160*a* can be any type of mounting type including, but not limited to, starlock mount or supercut. Further, while FIG. 1A shows attachment socket 160*a* as offset from the plane of breakaway cutting edges 110*a*, 120*a*, and 130*a*, aspects of the present disclosure are not limited in this regard. In certain aspects of the present disclosure, the attachment socket and the cutting edges of the blade are located substantially in the same plane in a non-offset configuration. Without limitation to any other aspect of the present disclosure, any type of oscillating tool connection may be utilized in embodiments herein.

Figure 1B:
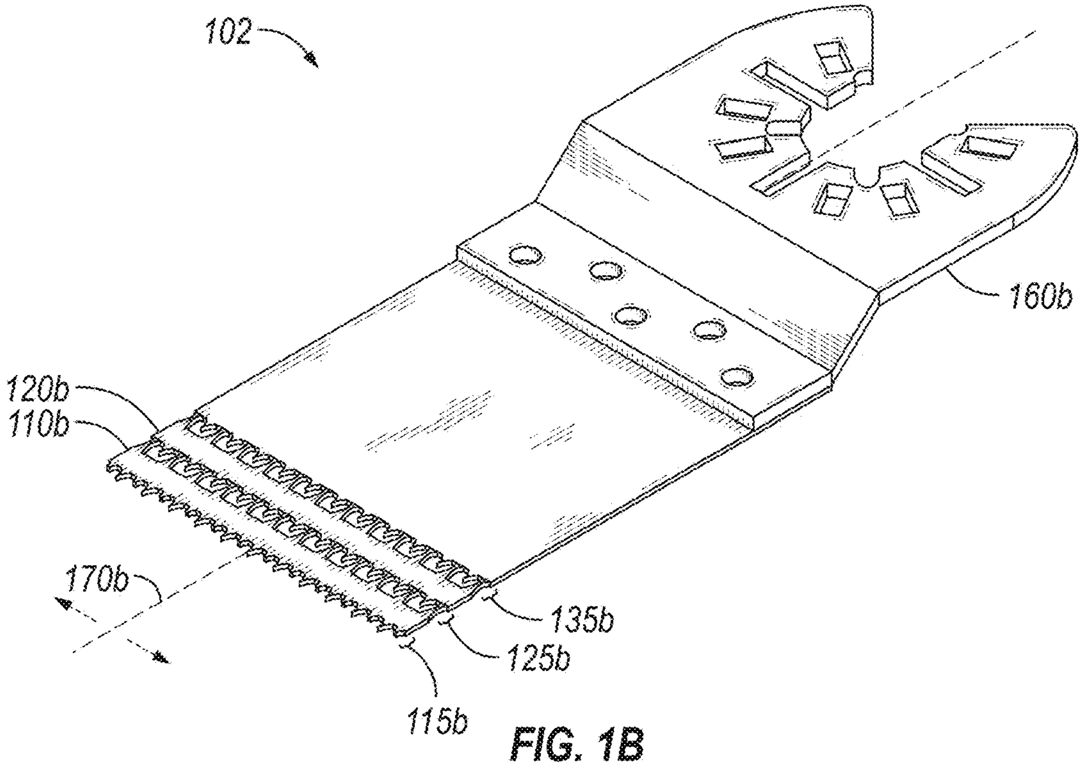
FIG. 1B is a perspective drawing depicting a multi-edge oscillating saw blade according to aspects of the present disclosure with a flat edge that includes two breakaway cutting edges and three cutting edges total.

Looking now to FIG. 1B, a second example multi-edge saw blade 102 according to aspects of the present disclosure is depicted. Multi-edge saw blade 102 is formed generally in a plane and includes a first row of cutting teeth 115*b* and two rows of perforations 125*b* and 135*b*, as compared to the three rows of perforations within the first example multi-edge saw blade 101 of FIG. 1A. Such a configuration provides multi-edge saw blade 102 with two breakaway cutting edges 110*b* and 120*b* and three cutting edges total. As with the multi-edge blade of FIG. 1A, the cutting edges of FIG. 1B provide a flat cutting edge, with first row of teeth 115*b* and first and second rows of perforations (125*b* and 135*b*, respectively) all oriented in straight lines substantially perpendicular to the axis of oscillation 170*b*. As with the blade of FIG. 1A, multi-edge saw blade 102 also includes an attachment socket 160*b* fixed to its proximate end which can be used to secure the multi-edge blade 102 to the oscillating drive member of an electric oscillating power tool. To this end, multi-edge saw blade 102 includes three usable "flat" blade edges in a single attachment accessory that can be used successively by breaking away a portion of the multi-edge saw blade between each row of perforations and the distal cutting edges as they become worn or damaged without removing the multi-edge saw blade itself from the tool.

It should be noted that within aspects of the present disclosure, the number of total cutting edges within a multi-edge saw blade can be any number that best befits the needs of a specific application. For example, a multi-edge saw blade according to aspects of the present disclosure can include only two cutting edges total by including only a single row of perforations. Or, in another example, a multi-edge saw blade according to aspects of the present disclosure could include six cutting edges by including five rows of perforations. Under different aspects of the present disclosure, the number of perforation rows and breakaway cutting edges is selected based on, without limitation, the requirements of a particular application, the material used to fabricate the multi-edge saw blade, the thickness of the multi-edge saw blade, the number of teeth in each cutting edge, the depth of the teeth in each cutting edge, the manufacturing method used to create the rows of perforations, or some combination of these design parameters. Under certain aspects of the present disclosure, a multi-edge saw blade will include "n" rows of perforations and "n+1" cutting edges total, wherein "n" comprises an integer greater than or equal to two.

The multi-edge saw blade of the present disclosure can be formed from any suitable material including, but not limited to, high carbon steel, stainless steel, a carbon alloy, carbon fiber, high density polyethylene, poly carbonate, thermoset plastic, high heat epoxy resin, or some combination of these materials. The selection of a material can typically depend on the material that the blade is intended to cut, characteristics of the blade such as sharpness, commercially acceptable wear profiles for the blade, or the like. In particular, a desired material hardness for the multi-edge saw blade may drive the selection of material as different blade hardness values are best suited for cutting different materials. For example, the material used to form the multi-edge saw blade may be selected such that the multi-edge saw blade has a hardness between 42 HRC and 56 HRC (Rockwell Hardness C Scale), inclusive. Or, the material used may be selected such that the multi-edge saw blade has a hardness of about 50 HRC. In certain embodiments, a coating and/or surface treatment may be utilized to adjust the hardness, thermal performance, and/or wear characteristics of the engaging surface of the blade.

Further, the thickness of the multi-edge saw blade can be any gauge as best befits the needs of an intended application for a given material selected. For example, the thickness of the saw blade could be within the ranges of 16-26 gauge (0.0187 inches-0.0625 inches), inclusive, 21-25 gauge (0.0219 inches-0.0344 inches), inclusive, or 22-24 gauge (0.025 inches-0.0312 inches), inclusive. In certain applications a lower gauge blade will allow for a smoother cut with less friction and finer control of the cut tolerances. In other applications, however, a thicker blade will provide more strength in the blade, suitable for cutting harder materials. In certain embodiments the blade thickness may be varied along the length and/or across the width of the blade, for example where the mechanical characteristics of the blade are more important than the specific cutting thickness for a given application. Similarly, the number of cutting teeth in each cutting edge and the depth of the cutting teeth (i.e., the length of the individual cutting teeth) are typically selected dependent on the needs of a specific application. For example, a coarse blade having a low number of large teeth may be suitable for an application wherein heavy cutting is required, and/or where fast, coarse cutting of the material is desirable and/or acceptable. In another example, a fine blade having a high number of small teeth may be suitable within an application that requires precision cutting of a relatively soft material. In certain applications, the teeth within each cutting edge have a size and number such that the distance between each tooth does not exceed the overall oscillation movement of the multi-edge saw blade.

In addition to the above design considerations, the selection of a material, a thickness, and the number and size of teeth within the cutting edges of the multi-edge saw blade of the present disclosure are also be selected such that breakaway edges can be readily removed when worn or damaged under a twisting force orthogonal to the plane of the saw blade while also remaining securely attached to the blade under an oscillating cutting or sawing operation. In some aspects of the present disclosure, these parameters are also influenced by the size and shape of the perforations in each row of perforations.

Additionally, in some aspects of the present disclosure, the multi-edge saw blade is coated to improve thermal performance, reduce friction between the blade and a material being cut, improve resistance to corrosion, improve resistance to chemical exposure, improve resistance to water, adjust the surface hardness of the blade, or some combination of these benefits. Within these aspects of the present disclosure, the multi-edge saw blade can be coated with ceramic, graphene, molybdenum disulfide, polytetrafluoroethylene, fluoropolymer, fluoropolymer with Xylan®, fluorinated ethylene propylene (FEP), or some combination of these materials. In some of these aspects of the present disclosure, the multi-edge saw blade is coated by a hot dipping process wherein the saw blade is submerged in a liquid coating. In other aspects of the present disclosure, the multi-edge saw blade is coated using a spray gun. Further, in some aspects of the present disclosure the multi-edge saw blade undergoes an electroless plating or conversion process wherein the surface layer of the blade material is transformed into a corrosion-resistant surface. For example, a black-oxide process can be used to oxidize the surface of a multi-edge saw blade, rendering the surface microporous and blackened. In certain embodiments, a surface treatment such as peening may be applied to adjust the surface hardness of the blade and/or cutting surfaces of the blade.

Figure 2A:
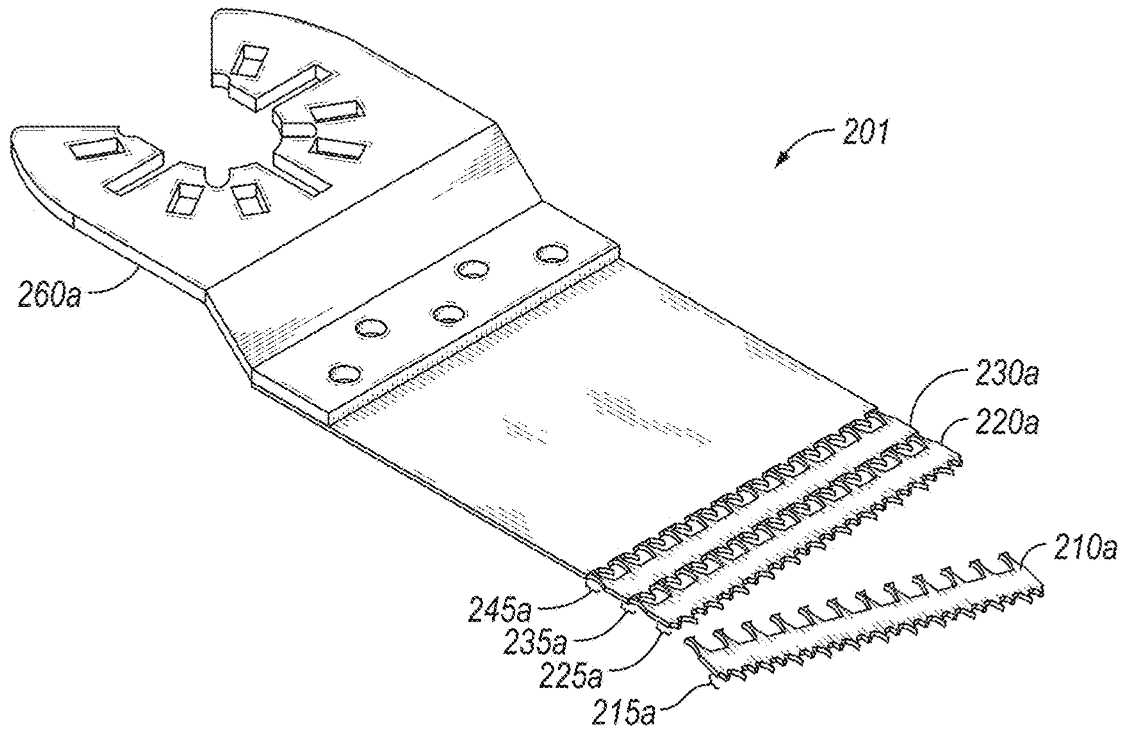
FIG. 2A is a perspective drawing depicting the multi-edge oscillating saw blade of FIG. 1A with one breakaway cutting edge detached from the saw blade.
Figure 2B:
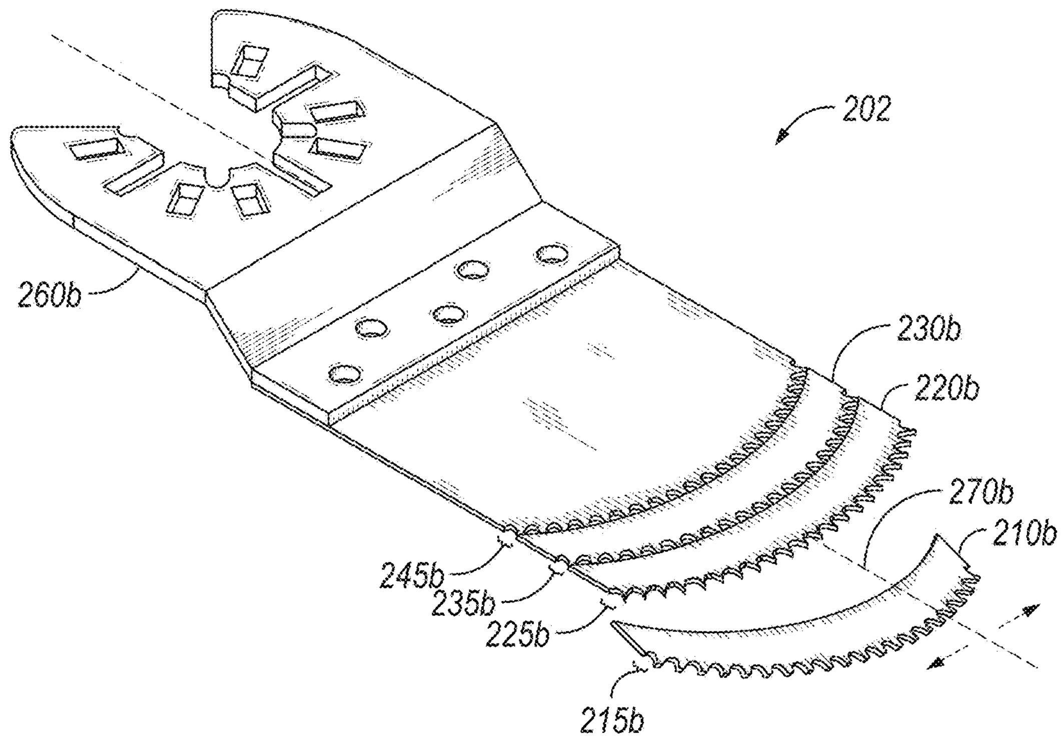
FIG. 2B is a perspective drawing depicting a multi-edge oscillating saw blade according to aspects of the present disclosure with a rounded edge that includes three breakaway cutting edges and four cutting edges total with one breakaway cutting edge detached from the saw blade.
Figure 2C:
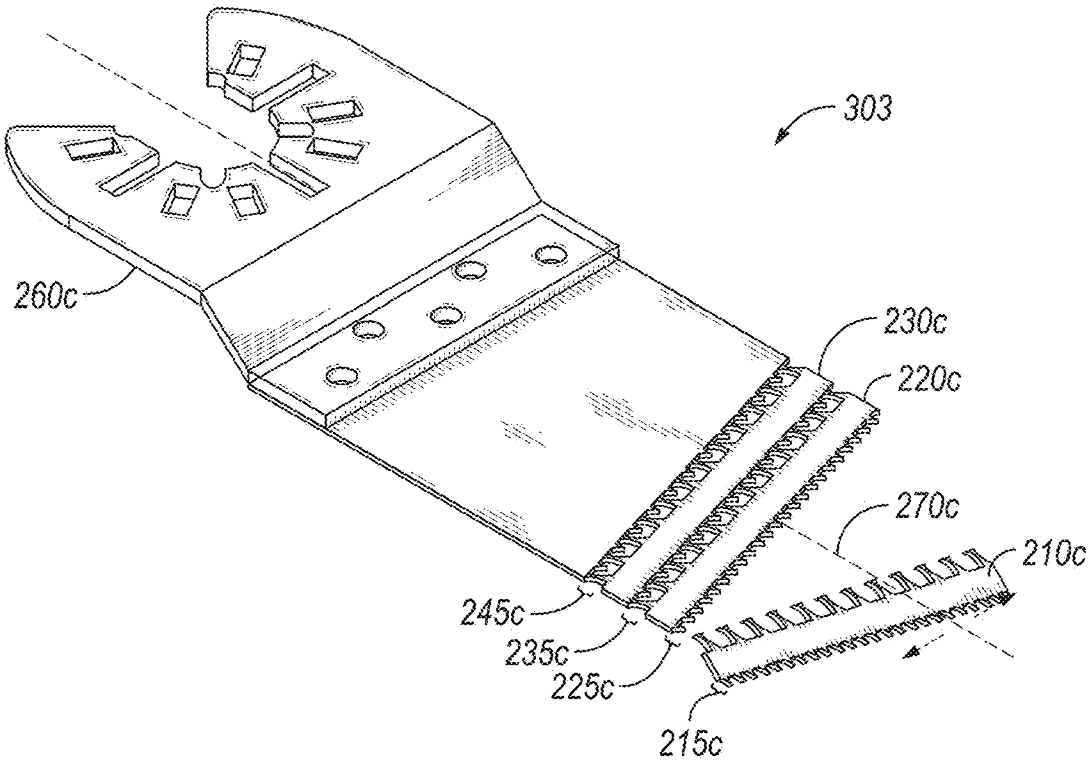
FIG. 2C is a perspective drawing depicting a multi-edge oscillating saw blade according to aspects of the present disclosure with an angled edge that includes three breakaway cutting edges and four cutting edges total with one breakaway cutting edge detached from the saw blade.

Referring now to FIG. 2A, a multi-edge saw blade 201 formed generally in a plane with a flat blade, three breakaway cutting edges (210*a*, 220*a*, and 230*a*), and four cutting edges total (similar to multi-edge saw blade 101 of FIG. 1A and discussed in detail above with respect to that figure) is illustrated with first breakaway edge 210*a* removed from the multi-edge saw blade 201. As discussed with respect to FIG. 1A, first breakaway edge 210*a* contains a first row of cutting teeth 215*a*. Once this first row of cutting teeth 215*a* becomes worn out or if several of the teeth become damaged during a cutting operation, breakaway edge 210*a* can be readily separated from multi-edge saw blade 201 along a first perforation row. By applying a twisting force orthogonal to the plane of the multi-edge saw blade 201, the connecting material between the perforations within the first row of perforations break, freeing first breakaway cutting edge 210*a* and rendering first row of perforations into a second row of cutting teeth 225*a*, which then form the new distal edge of multi-edge saw blade 201. In this way, a spent cutting edge (first row of teeth 215*a*) is removed and a second cutting edge is revealed, ready to continue work. Additionally, the second row of perforations 235*a* is available to allow separation of second breakaway cutting edge 220*a* from multi-edge blade 201 and reveal a third cutting edge when the second cutting edge wears out, and the third row of perforations 245*a* is available to subsequently allow separation of third breakaway cutting edge 230*a* and reveal a fourth cutting edge when the third cutting edge wears out. As with multi-edge blade 101 of FIG. 1A, multi-edge blade 201 further includes attachment socket 260*a* which can be used to fix or secure the blade to the oscillating drive member of an electric oscillating power tool. In this way, a single oscillating saw accessory attachment (the multi-edge saw blade of the present disclosure) can provide multiple cutting edges which can be subsequently used without removing the accessory attachment from an oscillating tool using the attachment.

Looking now to FIG. 2B, an example multi-edge saw blade 202 according to the present disclosure is shown that is formed generally in a plane and includes three breakaway cutting edges (210*b*, 220*b*, and 220*b*) and four cutting edges total wherein all of the cutting edges are rounded. As can be seen from FIG. 2B, the cutting teeth in first row of cutting teeth 215*b* are arranged in a curve centered on the axis of oscillation 270*b*. Embodiments herein set forth a curve centered on the axis of oscillation 270*b* as an example, but the curve of the blade, where present, may be asymmetrical. Additionally or alternatively, curved blades are depicted with a convex curvature, but the curvature may additionally or alternatively be convex in certain embodiments. In the example of FIG. 2B, the second row of cutting teeth 225*b* and third row of perforations 235*b* and fourth row of perforations 245*b* are also arranged into substantially congruent curves, all centered on the axis of oscillation 270*b*. Within some aspects of the present application, the cutting teeth and perforations are arranged in arcs that are a section of circle. Within such aspects, these arcs can be any selected portion of a circle, for example 30 degrees of a circle, 60 degrees of a circle, 90 degrees of a circle, 120 degrees of a circle, or some other fraction of a circle. Within such aspects the curve can comprise between 30 degrees and 120 degrees of a circle, inclusive. As with the example multi-edge saw blade 201 of FIG. 2A, multi-edge saw blade 202 is depicted with first breakaway cutting edge 210*b* separated from multi-edge saw blade 202, revealing a second row of cutting teeth 225*b*. Second and third rows of perforations (235*b* and 245*b*, respectively) further provide the ability to separate second breakaway cutting edge 220*b* and third second breakaway cutting edge 230*b* from multi-edge saw blade 202, providing a third and fourth row of cutting teeth as they are subsequently needed. As with multi-edge blade 101 of FIG. 1A, multi-edge blade 202 further includes attachment socket 260*b* which can be used to fix or secure the blade to the oscillating drive member of an electric oscillating power tool. In this way, a single oscillating saw accessory attachment (the multi-edge saw blade of the present disclosure) can provide multiple rounded cutting edges which can be subsequently used without removing the accessory attachment from an oscillating tool using the attachment.

Looking now to FIG. 2C, an example multi-edge saw blade 203 according to the present disclosure is shown that is formed generally in a plane and includes three breakaway cutting edges (210*c*, 220*c*, and 220*c*) and four cutting edges total wherein all of the cutting edges are angled. As can be seen from FIG. 2C, the cutting teeth in first row of cutting teeth 215*c* are arranged at an angle with respect to the axis of oscillation 270*c*. Second row of cutting teeth 225*c* and third row of perforations 235*c* and fourth row of perforations 245*c* are also arranged at substantially the same angle with respect to the axis of oscillation 270*c*. Within some aspects of the present disclosure, this angle can be 10 degrees, 20 degrees, 30 degrees, 45 degrees, or any other angle substantially less than 90 degrees. Withing some aspects of the present disclosure, this angle can be between 10 and 45 degrees, inclusive, or between 10 and 60 degrees, inclusive. As with the example multi-edge saw blade 201 of FIG. 2A, multi-edge saw blade 203 is depicted with first breakaway cutting edge 210*c* separated from multi-edge saw blade 203, revealing a second row of cutting teeth 225*c*. Second and third rows of perforations (235*c* and 245*c*, respectively) further provide the ability to separate second breakaway cutting edge 220*c* and third second breakaway cutting edge 230*c* from multi-edge saw blade 203, providing a third and fourth row of cutting teeth as they are subsequently needed. As with multi-edge blade 101 of FIG. 1A, multi-edge blade 203 further includes attachment socket 260*c* which can be used to fix or secure the blade to the oscillating drive member of an electric oscillating power tool. In this way, a single oscillating saw accessory attachment (the multi-edge saw blade of the present disclosure) can provide multiple angled cutting edges which can be subsequently used without removing the accessory attachment from an oscillating tool using the attachment.

Figure 3A:
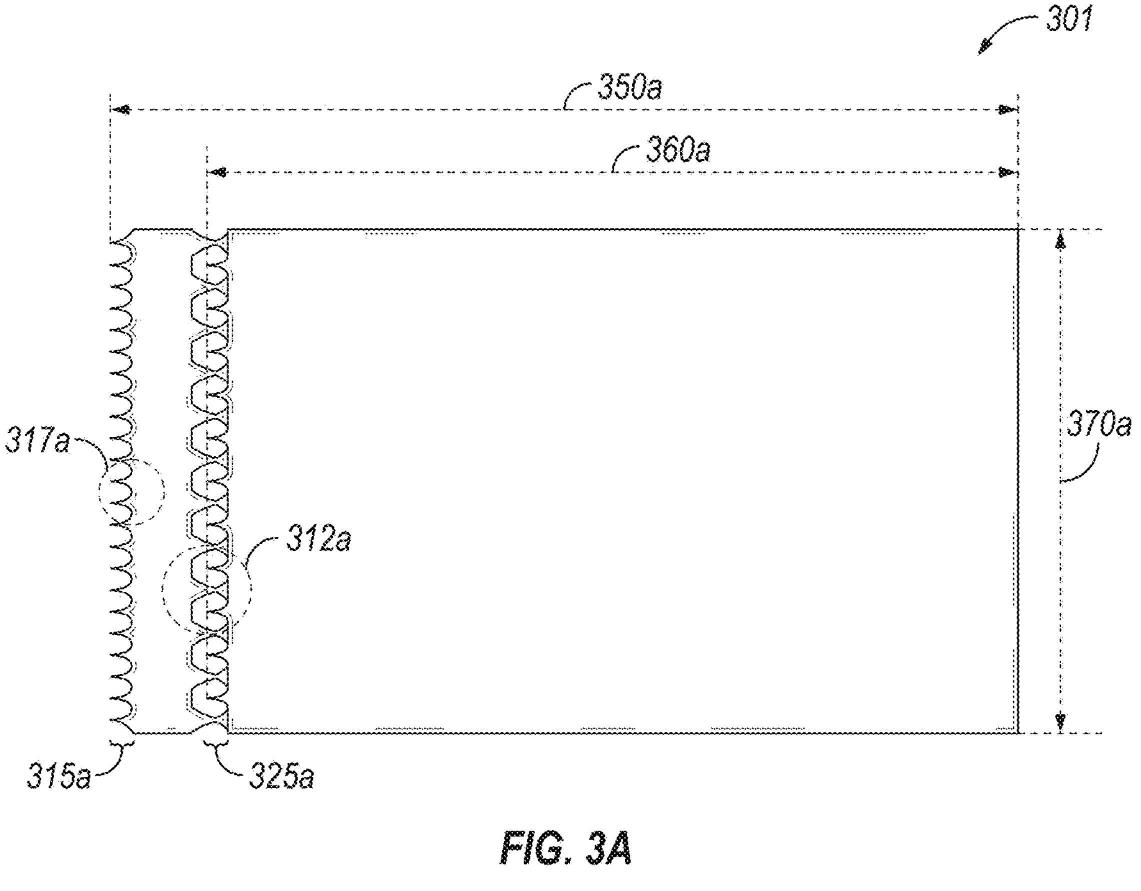
FIG. 3A is a dimensional drawing of the distal end of a multi-edge oscillating saw blade according to aspects of the present disclosure with a flat edge that includes one break away cutting edge and two cutting edges total.

Looking now to FIG. 3A, a dimensional drawing detailing the relative size dimensions of an example multi-edge saw blade 301 according to aspects of the present disclosure is shown. Multi-edge saw blade 301 includes a single row of perforations 325*a* and one breakaway cutting edge 310*a* that includes a first row of cutting teeth 315*a*. As described in detail above with respect to FIGS. 1A-1B and 2A-2C, when breakaway cutting edge 310*a* is removed from multi-edge saw blade 301, row of perforations 325*a* will be rendered into a second row of cutting teeth. Multi-edge saw blade 301 has an initial length 350*a*, running from the proximate edge of the blade to first row of cutting teeth 315*a*, and secondary length of 360*a*, running from the proximate edge of the blade to the row of perforations 325*a*, which become the distal edge of the saw blade when breakaway cutting edge 310*a* is removed. Multi-edge saw blade 301 has a fixed width 370*a* which remains constant before and after the removal of breakaway cutting edge 310*a*. Detail 312*a* is represented in FIG. 3B and illustrates an example pair of perforations (323*b* and 327*b*) according to the present disclosure, and detail 317*a* is represented in FIG. 3C and illustrates an example pair of cutting teeth (333*c* and 337*c*) according to aspects of the present disclosure.

Figure 3B:
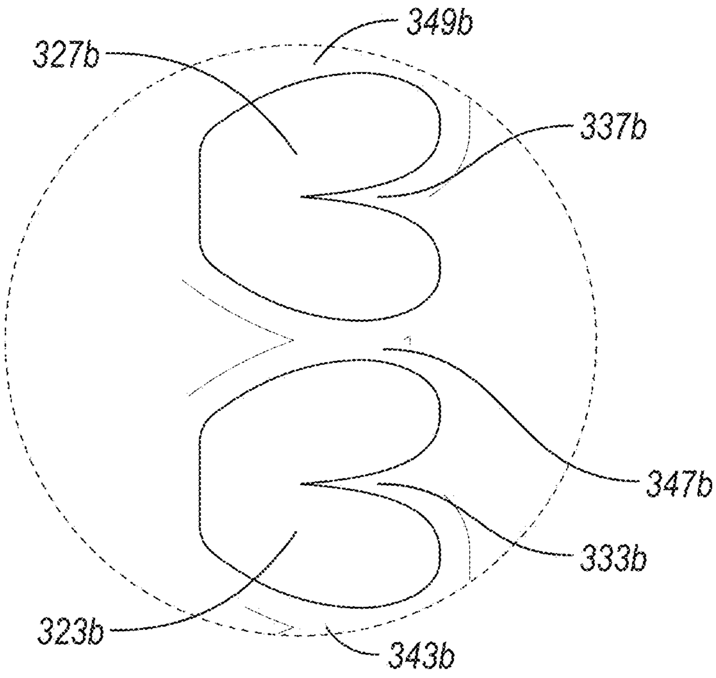
FIG. 3B is a dimensional drawing of a close-up view of two of the perforations in the multi-edge oscillating saw blade of FIG. 3A.
Figure 3C:
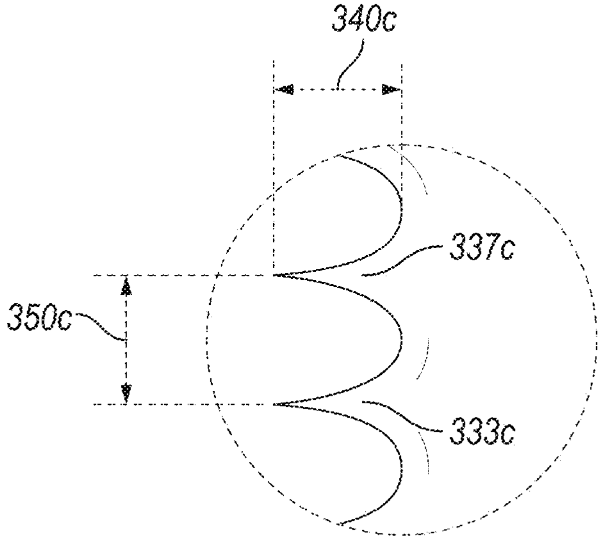
FIG. 3C is a dimensional drawing of a close-up view of two of the teeth of the breakaway cutting edge of the multi-edge oscillating saw blade of FIG. 3A.
Figure 3D:
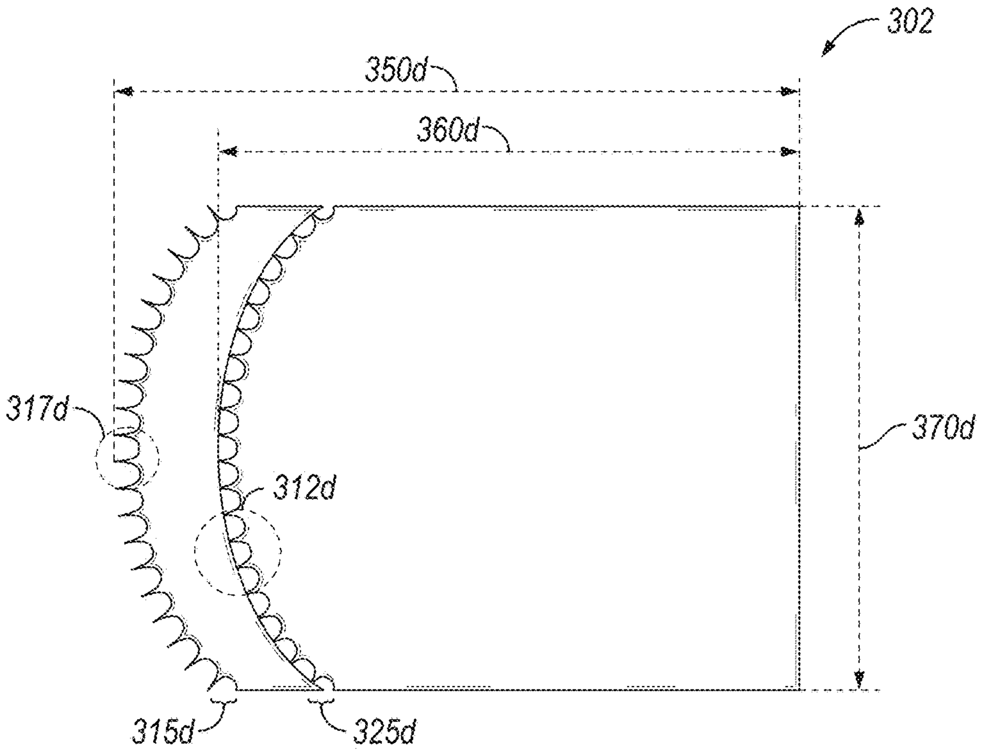
FIG. 3D is a dimensional drawing of the distal end of a multi-edge oscillating saw blade according to aspects of the present disclosure with a rounded edge that includes one break away cutting edge and two cutting edges total.

Looking to FIG. 3B, two perforations 323*b* and 327*b* are shown. As can be seen in FIG. 3B, the shape of perforations 323*b* and 327*b* are selected to realize cutting teeth 333*b* and 337*b* and connection elements 343*b*, 347*b*, and 349*b*. As discussed in detail above with respect to FIG. 2A, responsive to a twisting force applied orthogonally to the plane of multi-edge saw blade 301, connection elements 343*b*, 347*b*, and 349*b* break near their narrowest points and form additional cutting teeth while allowing breakaway cutting edge 310*a* to fall away. FIG. 3C illustrates two cutting teeth 333*c* and 337*c* on first row of cutting teeth 315*a*. The teeth 333*c* and 337*c* have a tooth depth 340*c* representing the length of each cutting tooth and a tooth spacing 350*c* representing the distance from the tip of one tooth to the next tooth. As described above, in some aspects of the present disclosure, the selection of tooth depth 340*c* and tooth spacing 350*c* is dependent on the needs of a specific application. For example, within an application wherein heavy cutting is required, a relatively large tooth depth 340*c* and a relatively wide tooth spacing 350*c* may be preferable. However, in another example wherein precision cutting is required, a relatively short tooth depth 340*c* and a relatively small tooth spacing 350*c* is preferable.

Within aspects of the present disclosure, the multi-edge saw blade can be formed using a plurality of manufacturing processes. For example, the initial row of cutting teeth with a selected tooth depth and tooth spacing (e.g., as detailed in FIG. 3C) and the one or more rows of perforations with a selected size and shape (e.g., as detailed in FIG. 3B) can be formed using a laser cut process, a water jet process, a 3D printing process, a plastic injection molding process, or die stamping. The preferred manufacturing process used to realize the multi-edge saw blade as described throughout the present specification can, in certain aspects of the present disclosure, be dependent on the material used to make the multi-edge saw blade, the quantity of multi-edge saw blades being produced, the degree of precision required to meet preselected design tolerances, and the application in which the multi-edge saw blades will be used. For example, in certain aspects of the present disclosure die stamping may be the preferred fabrication method for multi-edge saw blades made from metal alloys and requiring very high quantities. Or, in other aspects of the present disclosure, plastic injection molding might be more favorable for multi-edge saw blades fabricated from various plastic resins. Further, within aspects of the present disclosure, the number of teeth in each cutting edge, the size of the teeth (i.e., the "tooth depth") in each cutting edge, and distance between each tooth point (i.e., the "tooth spacing") in each cutting edge can be selected based on the needs of a particular application for the multi-edge saw blade. For example, one or more of these parameters (tooth number, tooth depth, and tooth spacing) can be selected to provide cutting edges suitable for cutting one of metal, plastic, wood, drywall, food products, or materials relevant to medical applications (e.g., bandages, skin, bone, connective tissue, other soft tissues, etc.).

Looking now to FIG. 3D, a dimensional drawing detailing the relative size dimensions of an example multi-edge saw blade 302 with rounded cutting edges according to aspects of the present disclosure is shown. Multi-edge saw blade 302 includes a single row of perforations 325*d* and one breakaway cutting edge 310*d* that includes a first row of cutting teeth 315*d*. As described in detail above with respect to FIGS. 1A-1B and 2A-2C, when breakaway cutting edge 310*d* is removed from multi-edge saw blade 302, row of perforations 325*d* will be rendered into a second row of cutting teeth. Multi-edge saw blade 302 has an initial length 350*d*, running from the proximate edge of the blade to the tip of the center tooth on the first row of cutting teeth 315*d*, and secondary length of 360*d*, running from the proximate edge of the blade to the front of the center perforation within row of perforations 325*d*, which become the distal edge of the saw blade when breakaway cutting edge 310*d* is removed. Multi-edge saw blade 302 has a fixed width 370*d* which remains constant before and after the removal of breakaway cutting edge 310*d*. Detail 312*d* is represented in FIG. 3E and illustrates three example perforations (323*e*, 327*e*, and 329*e*) according to the present disclosure, and detail 317*d* is represented in FIG. 3F and illustrates an example pair of cutting teeth (333*f* and 337*f*) according to aspects of the present disclosure.

Figure 3E:
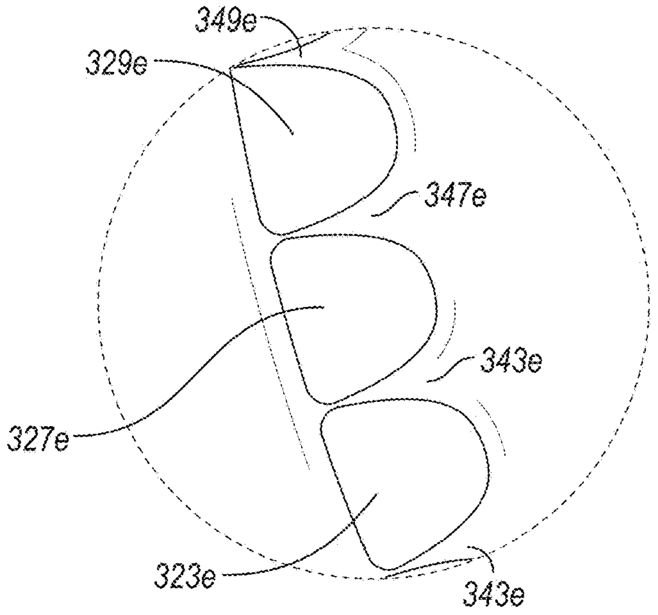
FIG. 3E is a dimensional drawing of a close-up view of three of the perforations in the multi-edge oscillating saw blade of FIG. 3D.
Figure 3F:
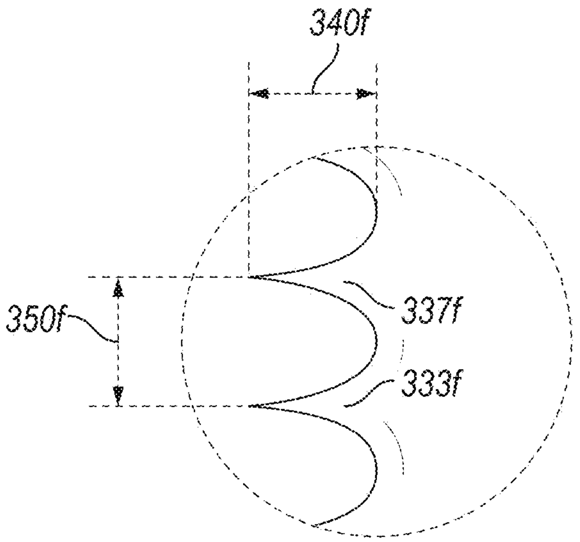
FIG. 3F is a dimensional drawing of a close-up view of two of the teeth of the breakaway cutting edge of the multi-edge oscillating saw blade of FIG. 3D.
Figure 3G:
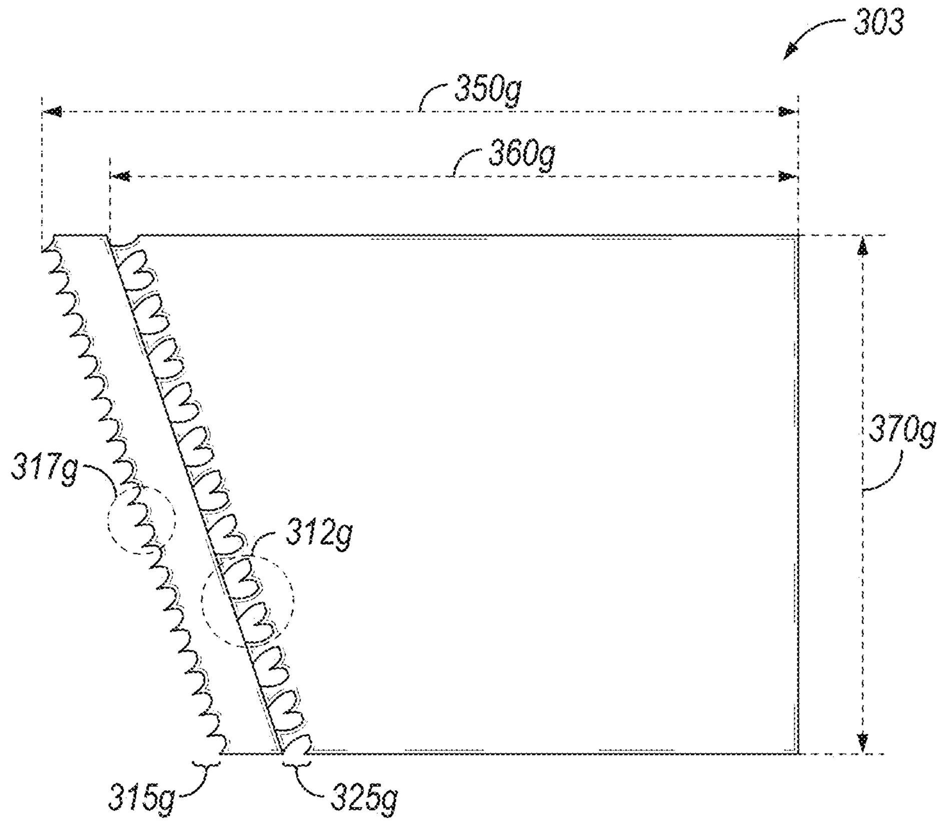
FIG. 3G is a dimensional drawing of the distal end of a multi-edge oscillating saw blade according to aspects of the present disclosure with an angled edge that includes one break away cutting edge and two cutting edges total.

Looking to FIG. 3E, three perforations 323*e*, 327*e*, and 329*e* are shown. As can be seen in FIG. 3E, the shape of perforations 323*e*, 327*e*, and 329*e* are selected to realize connection elements 341*e*, 343*e*, 347*e*, and 349*e*. As discussed in detail above with respect to FIG. 2A, responsive to a twisting force applied orthogonally to the plane of multi-edge saw blade 302, connection elements 341*e*, 343*e*, 347*e*, and 349*e* break near their narrowest point and form additional cutting teeth while allowing breakaway cutting edge 310*d* to fall away. FIG. 3F illustrates two cutting teeth 333*f* and 337*f* on first row of cutting teeth 315*d*. The teeth

333*f* and 337*f* have a tooth depth 340*f* representing the length of each cutting tooth and a tooth spacing 350*f* representing the distance from the tip of one tooth to the next tooth. As described above, in some aspects of the present disclosure, the selection of tooth depth 340*f* and tooth spacing 350*f* is dependent on the needs of a specific application. For example, within an application wherein heavy cutting is required, a relatively large tooth depth 340*f* and a relatively wide tooth spacing 350*f* would be preferable. However, in another example wherein precision cutting is required, a relatively short tooth depth 340*f* and a relatively small tooth spacing 350*f* is preferable.

Looking now to FIG. 3G, a dimensional drawing detailing the relative size dimensions of an example multi-edge saw blade 303 with angled cutting edges according to aspects of the present disclosure is shown. Multi-edge saw blade 303 includes a single row of perforations 325*g* and one breakaway cutting edge 310*g* that includes a first row of cutting teeth 315*g*. As described in detail above with respect to FIGS. 1A-1B and 2A-2C, when breakaway cutting edge 310*g* is removed from multi-edge saw blade 303, row of perforations 325*g* will be rendered into a second row of cutting teeth. Multi-edge saw blade 303 has an initial length 350*g*, running from the proximate edge of the blade to the tip of the furthest tooth on the first row of cutting teeth 315*g*, and secondary length of 360*g*, running from the proximate edge of the blade to the front of the furthest perforation within row of perforations 325*g*, which becomes the distal edge of the saw blade when breakaway cutting edge 310*g* is removed. Multi-edge saw blade 303 has a fixed width 370*g* which remains constant before and after the removal of breakaway cutting edge 310*g*. Detail 312*g* is represented in FIG. 3H and illustrates two example perforations (323*h* and 327*h*) according to methods of the present disclosure, and detail 317*g* is represented in FIG. 3F and illustrates three example cutting teeth (333*i*, 337*i*, and 339*i*) according to aspects of the present disclosure.

Figure 3H:
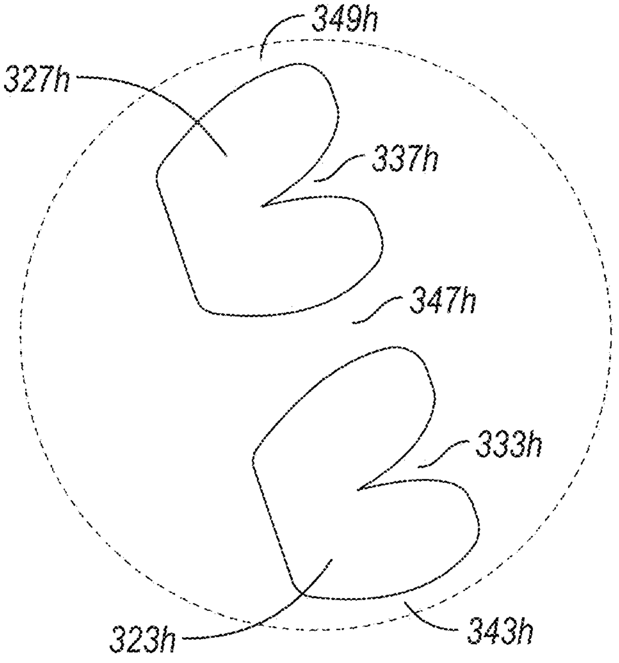
FIG. 3H is a dimensional drawing of a close-up view of two of the perforations in the multi-edge oscillating saw blade of FIG. 3G.
Figure 3I:
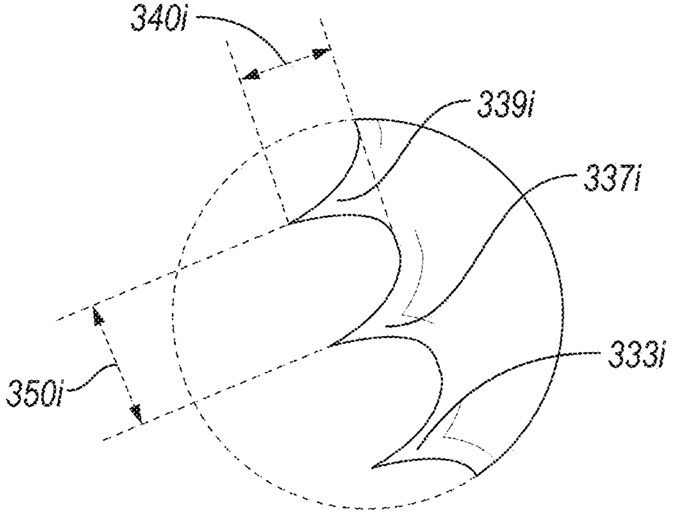
FIG. 3I is a dimensional drawing of a close-up view of three of the teeth of the breakaway cutting edge of the multi-edge oscillating saw blade of FIG. 3G.

Looking to FIG. 3H, two perforations 323*h* and 327*h* are shown. As can be seen in FIG. 3H, the shape of perforations 323*h* and 327*h* are selected to realize connection elements 343*h*, 347*h*, and 349*h*. As discussed in detail above with respect to FIG. 2A, responsive to a twisting force applied orthogonally to the plane of multi-edge saw blade 303, connection elements 343*h*, 347*h*, and 349*h* break near their narrowest point and form additional cutting teeth while allowing breakaway cutting edge 310*g* to fall away. FIG. 3I illustrates three cutting teeth 333*i*, 337*i*, and 339*i* on first row of cutting teeth 315*g*. The teeth 333*i*, 337*i*, and 337*i* have a tooth depth 340*i* representing the length of each cutting tooth and a tooth spacing 350*i* representing the distance from the tip of one tooth to the next tooth. As described above, in some aspects of the present disclosure, the selection of tooth depth 340*i* and tooth spacing 350*i* is dependent on the needs of a specific application. For example, within an application wherein heavy cutting is required, a relatively large tooth depth 340*i* and a relatively wide tooth spacing 350*i* may be preferable. However, in another example wherein precision cutting is required, a relatively short tooth depth 340*i* and a relatively small tooth spacing 350*i* may be preferable.

Figure 4A:
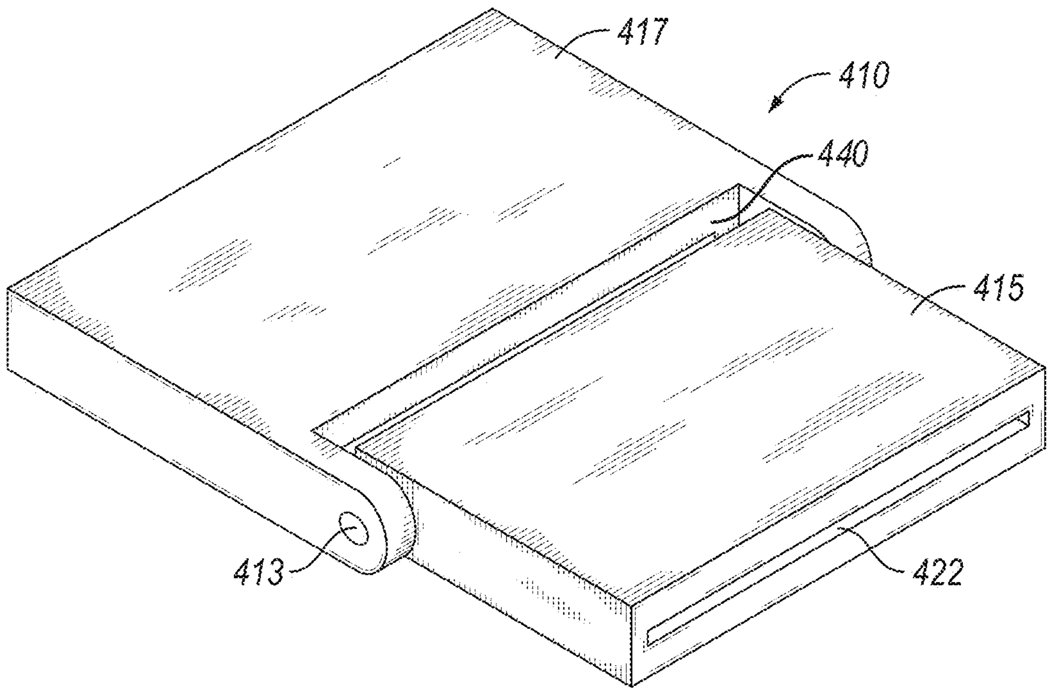
FIG. 4A is a perspective drawing depicting a blade edge removal tool according to aspects of the present disclosure.
Figure 4B:
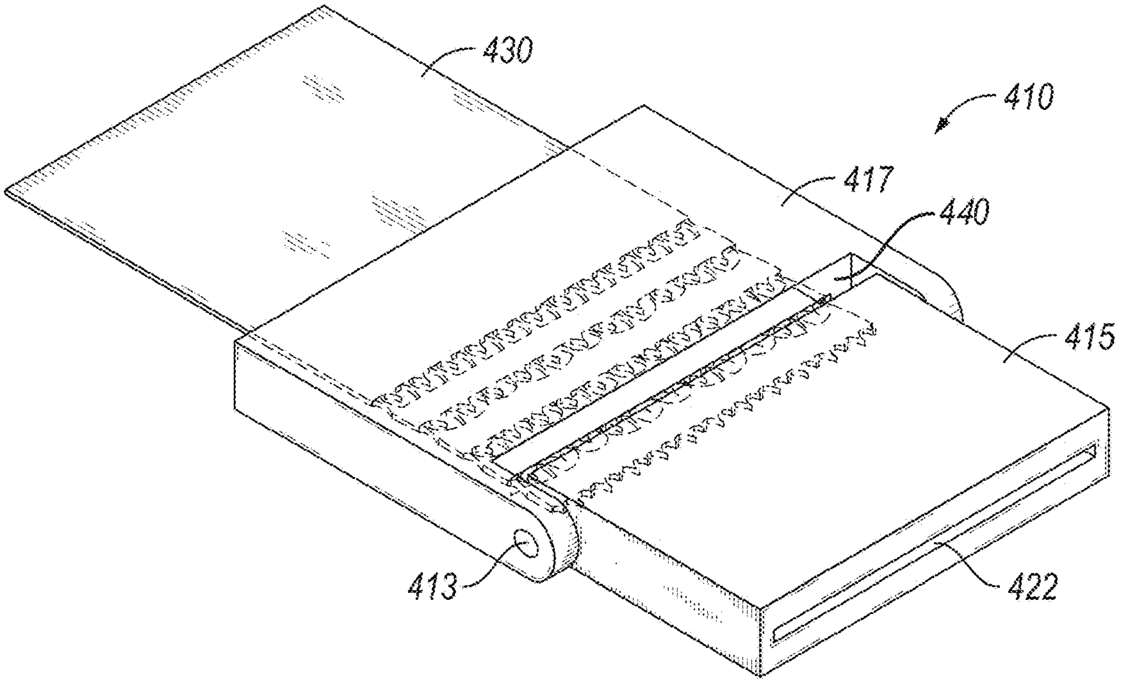
FIG. 4B is a perspective drawing depicting the blade edge removal tool of FIG. 4A inserted over a multi-edge oscillating saw blade.
Figure 4C:
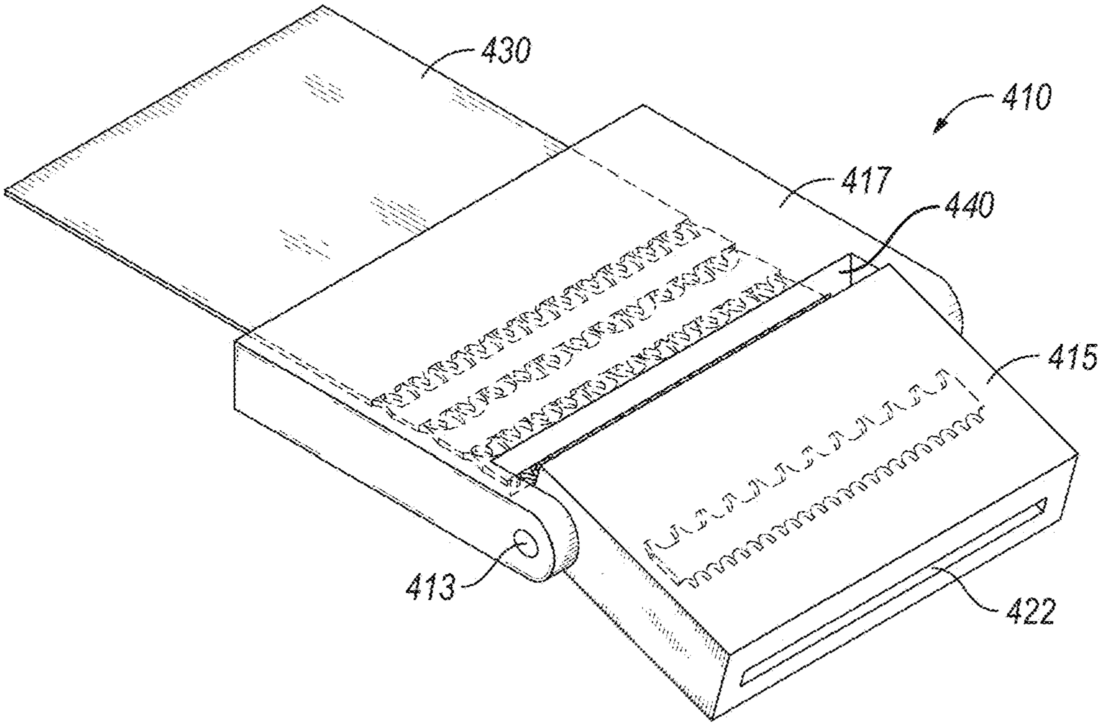
FIG. 4C is a perspective drawing depicting the blade edge removal tool of FIG. 4A removing a breakaway cutting edge from a multi-edge oscillating saw blade according to aspects of the present disclosure.
Figure 4D:
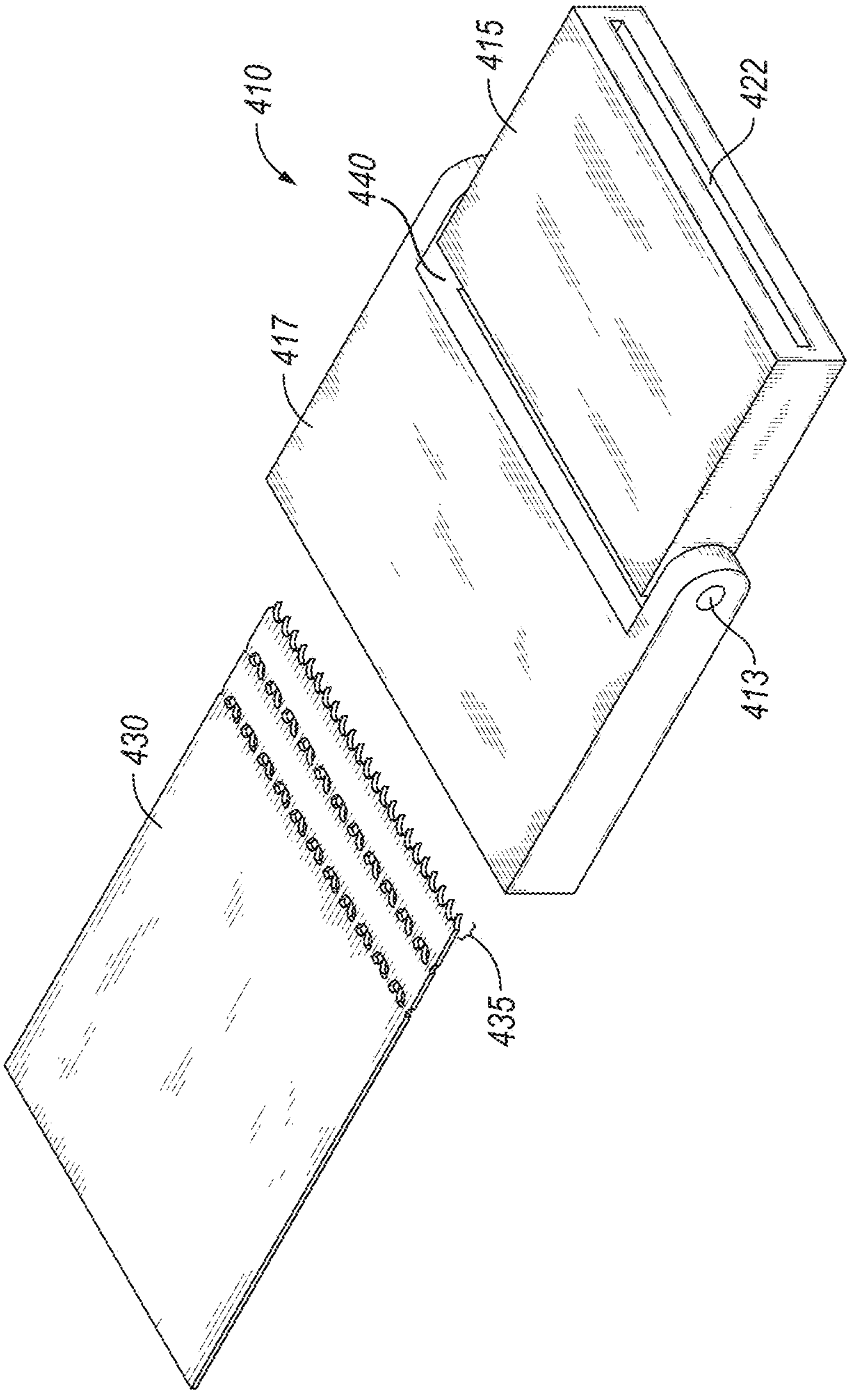
FIG. 4D is a perspective drawing depicting the blade edge removal tool of FIG. 4A being removed from multi-edge oscillating saw blade of FIG. 4C after the removal of a breakaway cutting edge according to aspects of the present disclosure.

FIG. 4A shows a perspective drawing of an example blade edge removal tool 410 according to the present disclosure. In some aspects of the present disclosure, a blade edge removal tool 410 can be used to assist a user in removing a worn or damaged breakaway blade edge from a multi-edge saw blade. Blade edge removal tool 410 includes a bracing member 417 connected to a snapping member 415 at pivot points 413 (only one pivot point is visible in FIG. 4A). A confirmation slot 440 is situated between bracing member 417 and snapping member 415 to permit a user to align and visibly confirm the placement of a perforation row of a multi-edge blade within the blade removal tool 410. A separate slot (not visible in FIG. 4A) wide and tall enough to permit passing of a multi-edge saw blade runs through bracing member 417 and aligns with a similar slot 422 in snapping member 415. Looking now to FIG. 4B, blade edge removal tool 410 is positioned over a multi-edge saw blade 430 according to the present disclosure through the slot in bracing member 417 (not visible in FIG. 4B) and slot 422 in snapping member 415. As can be seen in FIG. 4B, blade edge removal tool 410 is positioned such that the row of perforations nearest the distal edge of multi-edge saw blade 430 is situated in the confirmation slot 440 between bracing member 417 and snapping member 415, with the leading breakaway cutting edge at least partially inside slot 422. Looking now to FIG. 4C, with bracing member 417 held in place, snapping member 415 is rotated about pivot points 413 (again, only one of the pivot points 413 is visible in FIG. 4C). This rotation provides a twisting, downward force on the breakaway cutting edge within slot 422. Responsive to this force, the connecting material between the perforations break (as described with respect to FIGS. 3A-3B), freeing the leading breakaway cutting edge from multi-edge saw blade 430 and realizing a new cutting edge across the new distal edge of multi-edge saw blade 430. Looking finally to FIG. 4D, with the worn or damaged breakaway cutting edge removed, the blade edge removal tool 410 is removed from multi-edge saw blade 430, leaving it ready to continue operating with a fresh cutting edge, 435.

It should be noted that while blade edge removal tool 410 can be used in certain applications to aid a user in removing a worn or damaged breakaway blade edge, not all applications require such a specialized tool to remove worn or damaged breakaway blade edges. Indeed, in certain applications, a worn or damaged breakaway blade edge can be removed using a standard tool, such as, but not limited to, a pair of pliers. In certain applications, the blade edge removal tool 410, as depicted in FIGS. 4A-4D can be a convenience option, providing users with a small and efficient tool for rapidly removing spent breakaway blade edges. In other applications, the blade edge removal tool can be a necessary tool for effectively removing spent breakaway blade edges. In certain applications, it may be desirable that the blade can be operated without a removal tool, for example applications in confined spaces or limited access, where the number of tools to be carried by the operator will be minimized. It can be seen that the blade edge removal tool 410 provides for convenient blade removal with a reduced risk of damage to the blade, injury of the user, consistently applied removal force, enhanced removal force distributed across the width of the blade, and/or ease in capturing the removed cutting tooth row (e.g., to ensure proper disposal). Accordingly, the removal tool, where present, enhances the convenience and efficiency provided by the blade, and/or allows for blade configurations that would otherwise be unavailable—for example a blade designed for use with a removal tool may allow for a greater removal force, thicker blade, stiffer blade, and/or a blade with a greater mechanical strength profile.

Figure 5A:
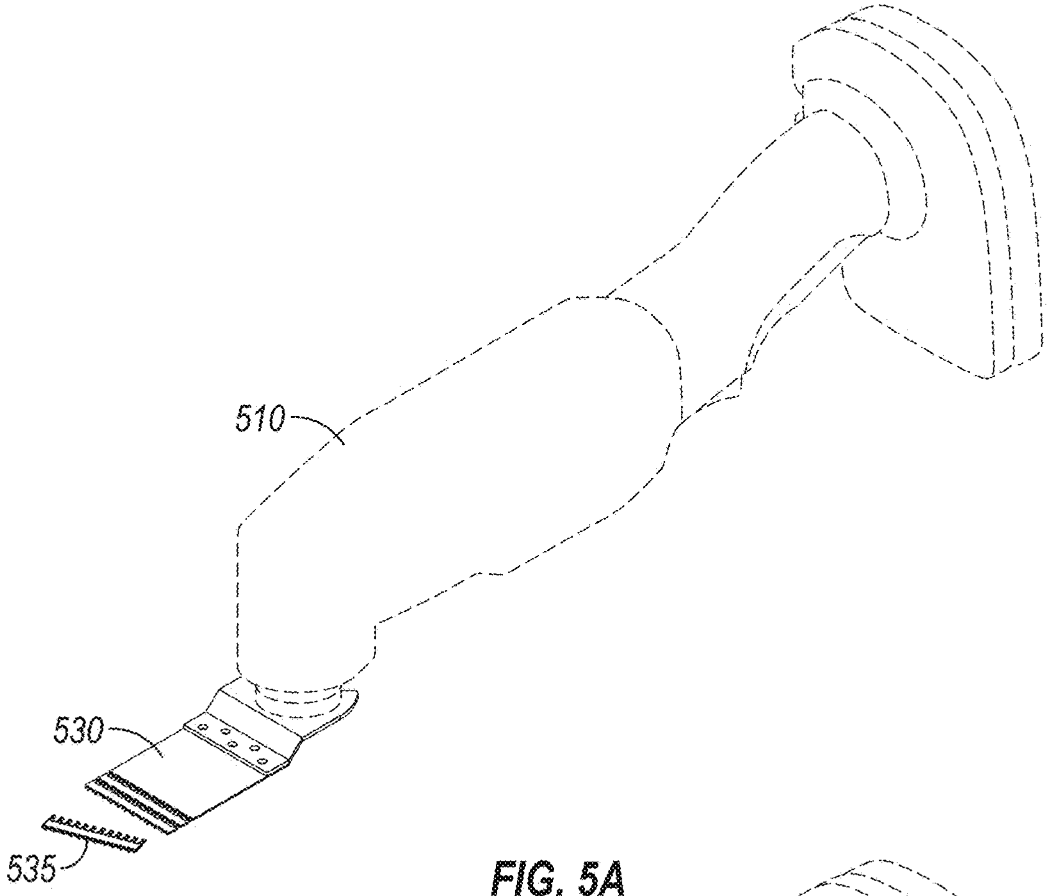
FIG. 5A is a perspective drawing depicting a multi-edge oscillating saw blade according to aspects of the present disclosure attached to an oscillating tool while a breakaway blade edge is removed.
Figure 5B:
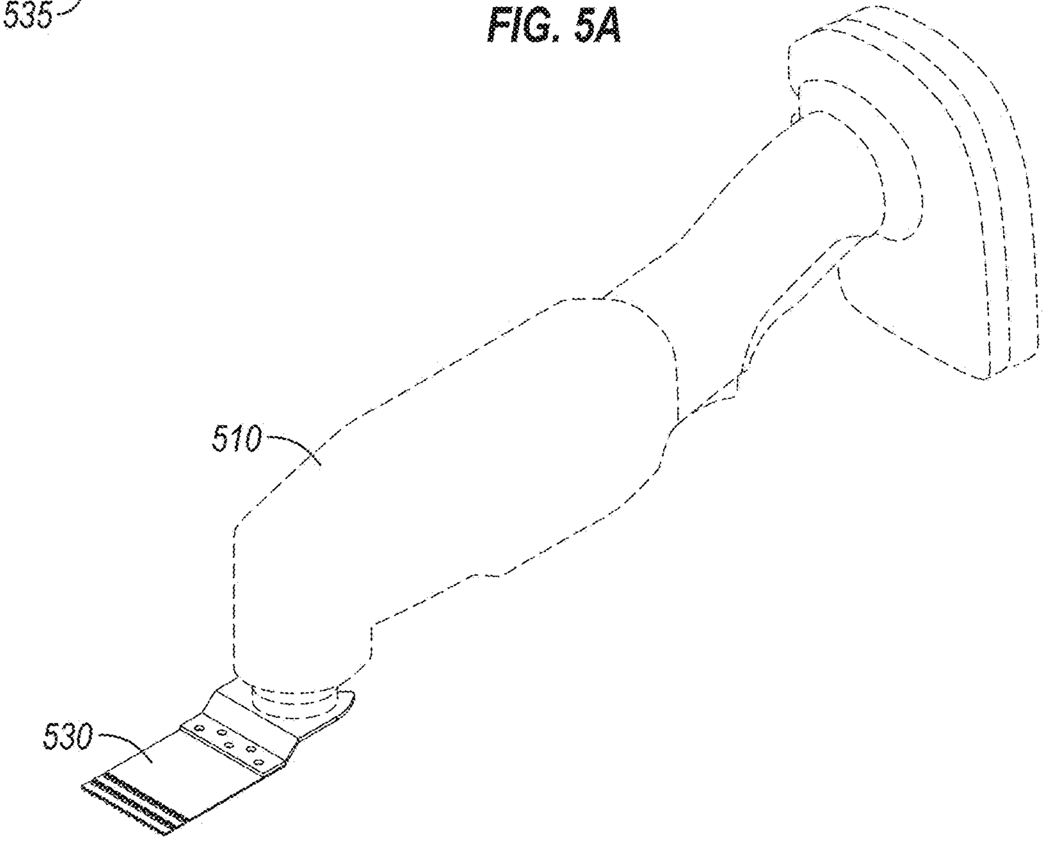
FIG. 5B is a perspective drawing depicting a multi-edge oscillating saw blade according to aspects of the present disclosure attached to an oscillating tool after the removal of a breakaway cutting edge.

Looking now to FIG. 5A, a multi-edge saw blade 530 according to aspects of the present disclosure is shown attached to an oscillating tool 510. Within FIG. 5A, a break away cutting edge 535 is shown being removed from multi-edge saw blade 530 without the blade 530 being disengaged from the tool 510. As can be seen in FIG. 5B, immediately subsequent to the removal of breakaway cutting edge 535, multi-edge saw blade 530 is ready to continue sawing or cutting operations with a fresh cutting edge across its distal edge. In this way, as described throughout the present disclosure, the multi-edge saw blade 530 provides a saw blade for an oscillating tool 510 that includes multiple cutting edges that can be used sequentially without ever disengaging or otherwise removing the blade 530 from the tool.

Figure 6:
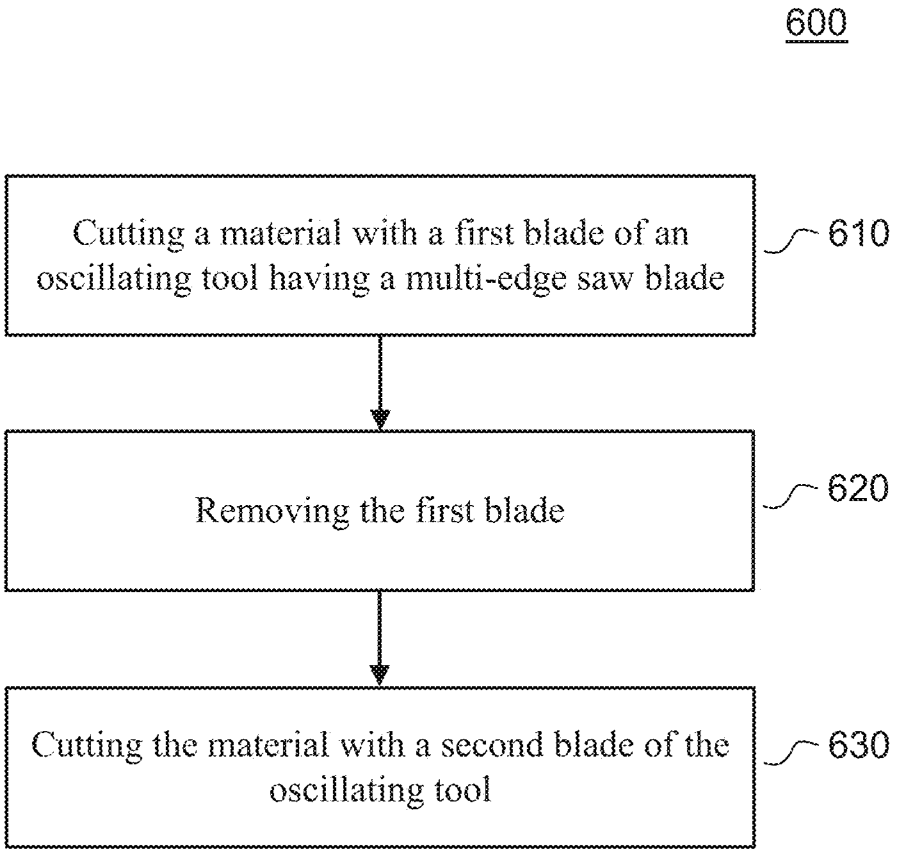
FIG. 6 is a flow chart for a first example method of using a multi-edge oscillating saw blade according to aspects of the present disclosure.
Figure 7:
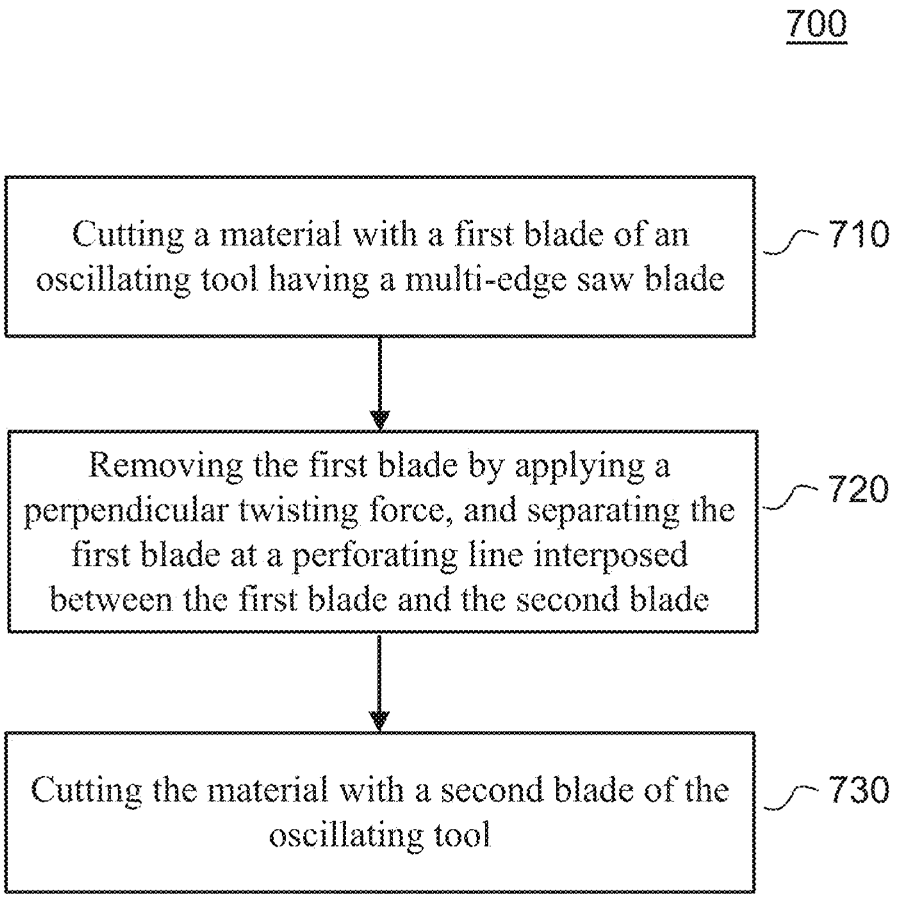
FIG. 7 is a flow chart for a second example method of using a multi-edge oscillating saw blade according to aspects of the present disclosure.
Figure 8:
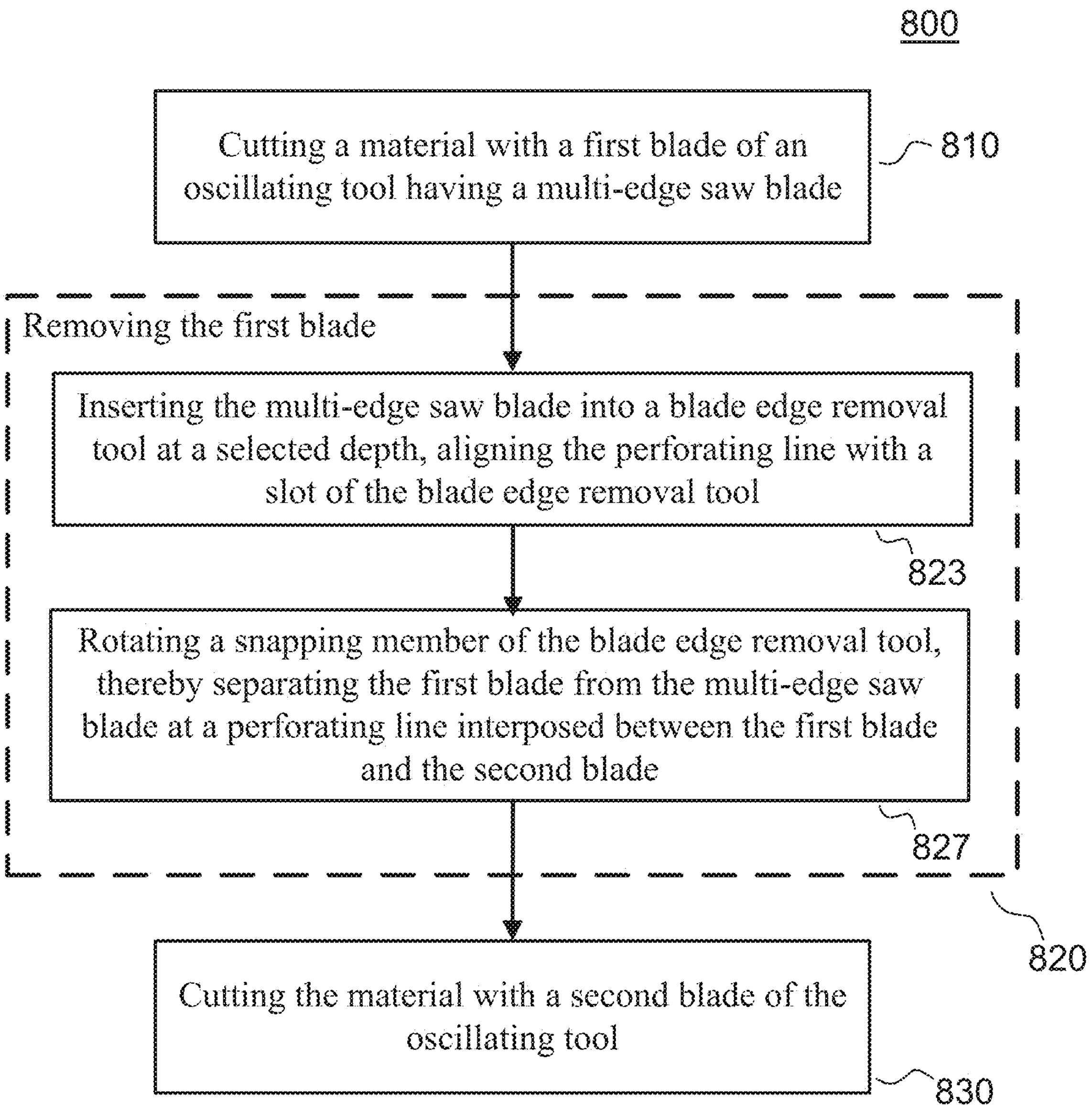
FIG. 8 is a flow chart for a third example method of using a multi-edge oscillating saw blade and a blade removal tool according to aspects of the present disclosure.

Referencing FIG. 6, an example procedure 600 includes an operation 610 to cut a material with a first blade of an oscillating tool having a multi-edge saw blade, an operation 620 to remove the first blade, and an operation 630 to cut the material with a second blade of the oscillating tool. Looking to FIG. 7, a second example procedure 700 includes an operation 710 to cut a material with a first blade of an oscillating tool having a multi-edge saw blade, an operation 720 to remove the first blade by applying a perpendicular twisting force and separating the first blade at a perforating line interposed between the first blade and the second blade, and an operation 730 to cut the material with a second blade of the oscillating tool. Looking to FIG. 8, a third example procedure 800 includes an operation 810 to cut a material with a first blade of an oscillating tool having a multi-edge saw blade, an operation 820 to remove the first blade comprising a sub-operation 823 to insert the multi-edge saw blade into a blade edge removal tool at a selected depth, aligning the perforating line with a confirmation slot on the blade edge removal tool followed by a sub-operation 827 to rotate a snapping member of the blade edge removal tool and thereby separate the first blade from the multi-edge saw blade at a perforating line interposed between the first blade and the second blade, and an operation 830 to cut the material with a second blade of the oscillating tool. The example procedures of FIGS. 6, 7, and 8 may be performed using any tool and/or multi-edge blade as described throughout the present specification.

Some aspects of the present disclosure provide a kit that includes a multi-edge blade according to aspects of the present disclosure and a blade edge removal tool. Elements of the kit may be embodied in any of the tools or blades as set forth throughout the present specification. As described in detail within the discussions of FIG. 1A-1B, 2A-2C, and 3A-3I above, the multi-edge blade within the kit comprises a plurality of rows of cutting teeth with a corresponding perforating line interposed between each adjacent row of cutting teeth. The kit further includes a blade edge removal tool according to aspects of the present disclosure. As described in detail with respect to FIGS. 4A-4D above, the blade edge removal tool comprises a bracing member having a slot configured to permit the passing of a multi-edge blade through the bracing member. The blade edge removal tool further comprises a snapping member pivotally coupled to the bracing member and configured to apply a perpendicular twisting force to the multi-edge blade in response to a pivoting motion of the snapping member. In some aspects of the present disclosure, the blade edge removal tool within the kit further includes a confirmation slot interposed between the bracing member and the snapping member. Within such aspects the confirmation slot comprises a shape corresponding to the shape of each perforating line of the multi-edge blade. For example, if the kit includes a multi-edge blade with a flat edge, with rows of teeth and perforations oriented in straight lines substantially perpendicular to an intended axis of oscillation, then the confirmation slot will also be oriented in a straight line substantially perpendicular to the intended axis of oscillation. In other examples, for multi-edge blades that are curved, as shown, for example, in FIGS. 2B and 3D, the confirmation slot will also be curved to match the shape of the rows of teeth and perforations, and for multi-edge blades that are angled, as shown, for example, in FIGS. 2C and 3G, the confirmation slot will also be angled to match the shape of the rows of teeth and perforations.

Figure 9:
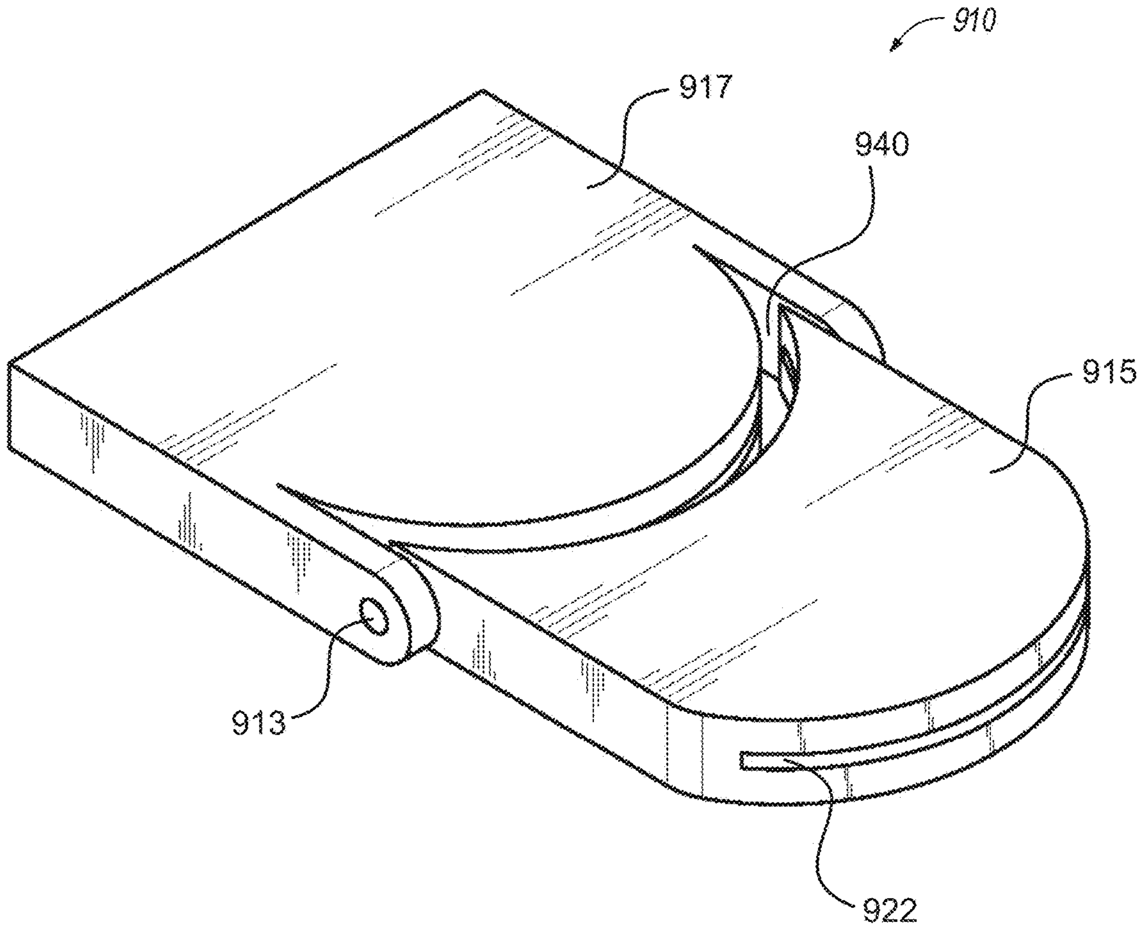
FIG. 9 is a perspective drawing depicting a blade edge removal tool according to aspects of the present disclosure suitable for use with a curved multi-edge blade.

FIG. 9 shows a perspective drawing of an example blade edge removal tool 910 according to the present disclosure having a curved confirmation slot 940 and suitable for use with a curved multi-edge blade according to aspects of the present disclosure. In some aspects of the present disclosure, a blade edge removal tool 910 can be used to assist a user in removing a worn or damaged breakaway blade edge from a curved multi-edge saw blade. Blade edge removal tool 910 includes a bracing member 917 connected to a snapping member 915 at pivot points 913 (only one pivot point is visible in FIG. 9). A confirmation slot 940 is situated between bracing member 917 and snapping member 915 to permit a user to properly align a perforation row of a multi-edge blade into the blade removal tool 910. A separate slot (not visible in FIG. 9) wide and tall enough to permit passing of a multi-edge saw blade runs through bracing member 917 and aligns with a similar slot 922 in snapping member 915.

Figure 10:
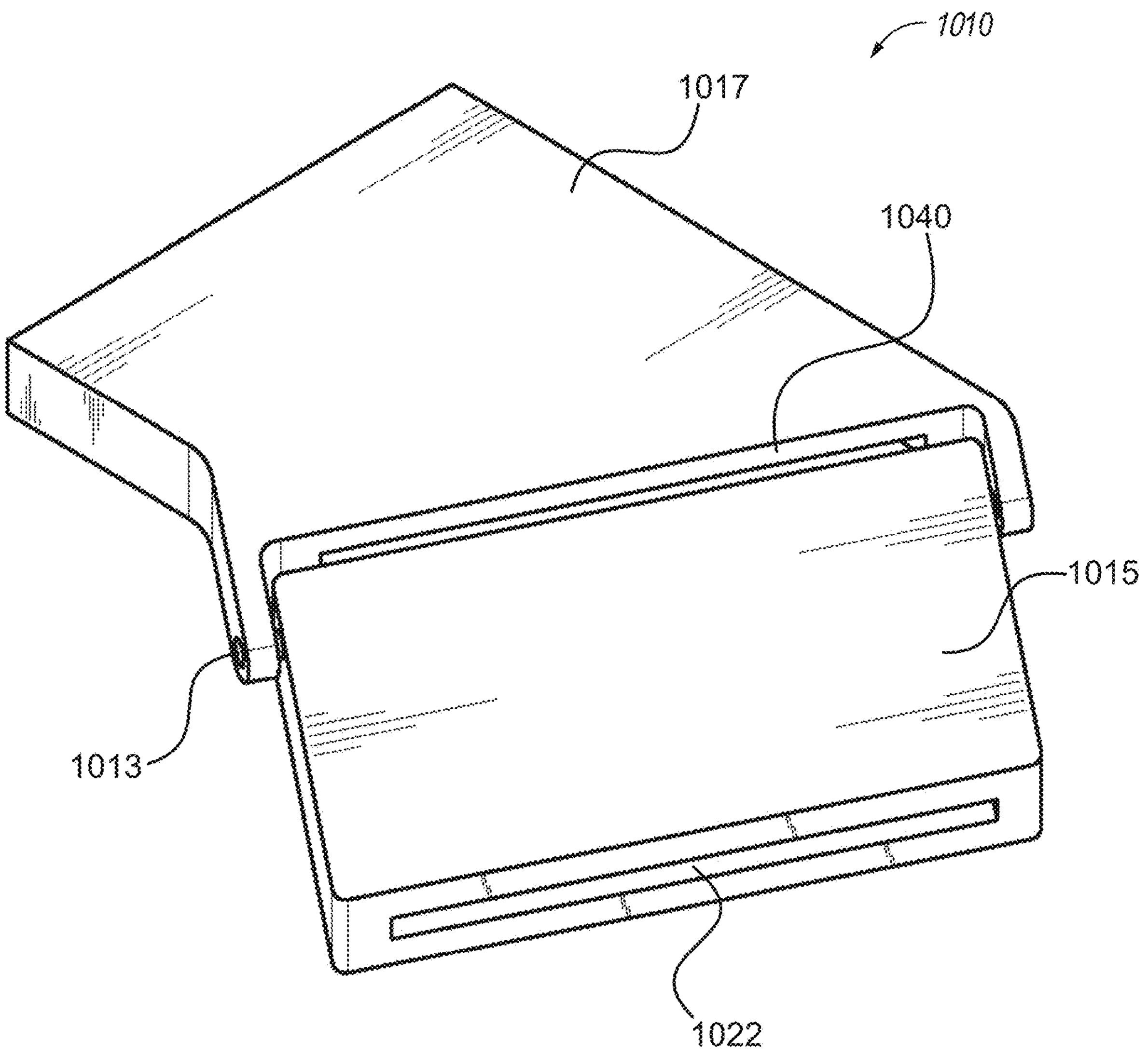
FIG. 10 is a perspective drawing depicting a blade edge removal tool according to aspects of the present disclosure suitable for use with an angled multi-edge blade.

FIG. 10 shows a perspective drawing of an example blade edge removal tool 1010 according to the present disclosure having an angled confirmation slot 1040 and suitable for use with an angled multi-edge blade according to aspects of the present disclosure. In some aspects of the present disclosure, a blade edge removal tool 1010 can be used to assist a user in removing a worn or damaged breakaway blade edge from an angled multi-edge saw blade. Blade edge removal tool 1010 includes a bracing member 1017 connected to a snapping member 1015 at pivot points 1013 (only one pivot point is visible in FIG. 10). A confirmation slot 1040 is situated between bracing member 1017 and snapping member 1015 to permit a user to properly align a perforation row of a multi-edge blade into the blade removal tool 1010. A separate slot (not visible in FIG. 10) wide and tall enough to permit passing of a multi-edge saw blade runs through bracing member 1017 and aligns with a similar slot 1022 in snapping member 1015.

While the disclosure has been disclosed in connection with the preferred embodiments shown and described in detail, various modifications and improvements thereon will become readily apparent to those skilled in the art. Accordingly, the scope of the present disclosure is not to be limited by the foregoing examples, but is to be understood in the broadest sense allowable by law.

What is claimed is:

1. A multi-edge saw blade for use in an oscillating tool, comprising:

a proximal end that includes an attachment socket configured to mate with an oscillating drive member of a power tool and oscillate about an axis of oscillation;

a distal end having a distal edge formed into a first cutting edge that includes a first row of cutting teeth situated across the distal edge and at least one row of perforations a spaced distance behind the first row of cutting teeth, wherein each of the at least one row of perforations realizes at least one breakaway line and at least one additional cutting edge comprising at least one additional row of cutting teeth; and wherein:

each of the at least one row of perforations is sized and shaped such that responsive to a force applied orthogonally to a plane of the distal end of the multi-edge saw blade, a portion of the distal end between the first row of cutting teeth and the row of perforations nearest the distal edge breaks away from the multi-edge saw blade revealing an additional cutting edge; and each of the perforations defines one or more connection elements disposed between each blade, each of the one or more connection elements structured to break at a most narrow portion of the connection element.

2. The multi-edge saw blade of claim 1, wherein the first row of cutting teeth and each additional row of cutting teeth are arranged perpendicular to the axis of oscillation.

3. The multi-edge saw blade of claim 1, wherein the first row of cutting teeth and each additional row of cutting teeth are arranged at an angle with respect to the axis of oscillation.

4. The multi-edge saw blade of claim 3, wherein the angle is between 10 degrees and 45 degrees, inclusive.

5. The multi-edge saw blade of claim 3, wherein the angle is between 10 degrees and 60 degrees, inclusive.

6. The multi-edge saw blade of claim 1, wherein the first row of cutting teeth and each additional row of cutting teeth are arranged in a curve.

7. The multi-edge saw blade of claim 6, wherein the curve comprises an arc of a circle.

8. The multi-edge saw blade of claim 7, wherein the curve comprises between 30 degrees and 120 degrees of the circle, inclusive.

9. The multi-edge saw blade of claim 6, wherein the curve is centered on the axis of oscillation.

10. The multi-edge saw blade of claim 1, wherein the distal end of the multi-edge saw blade includes one row of perforations, and the multi-edge saw blade includes two cutting edges total.

11. The multi-edge saw blade of claim 1, wherein the distal end of the multi-edge saw blade includes two rows of perforations, and the multi-edge saw blade includes three cutting edges total.

12. The multi-edge saw blade of claim 1, wherein the distal end of the multi-edge saw blade includes n rows of perforations, and the multi-edge saw blade includes n+1 cutting edges total, where n comprises an integer greater than two (2).

13. The multi-edge saw blade of claim 1, wherein the multi-edge saw blade comprises at least one of high carbon steel, stainless steel, a carbon alloy, carbon fiber, high density polyethylene, poly carbonate, thermoset plastic, or high heat epoxy resin.

14. The multi-edge saw blade of claim 1, wherein the multi-edge saw blade has a thickness within a range of 26 gauge/0.0187 inches to 16 gauge/0.0625 inches, inclusive.

15. The multi-edge saw blade of claim 1, wherein the multi-edge saw blade has a thickness within a range of 25 gauge/0.0219 inches to 21 gauge/0.0344 inches, inclusive.

16. The multi-edge saw blade of claim 1, wherein the multi-edge saw blade has a hardness in a range of 42 HRC to 56 HRC, inclusive.

17. The multi-edge saw blade of claim 1, wherein the multi-edge saw blade has a hardness of 50 HRC.

18. The multi-edge saw blade of claim 1, wherein the multi-edge saw blade is coated with at least one of ceramic, graphene, molybdenum disulfide coating, fluorinated ethylene propylene, polytetrafluoroethylene, fluoropolymer, or fluoropolymer with Xylan®.

19. The multi-edge saw blade of claim 1, wherein at least the distal end of the multi-edge saw blade is oxidized to realize a corrosion-resistant surface.

20. The multi-edge saw blade of claim 1, wherein the first cutting edge and the at least one additional cutting edge each have rows of teeth having a number of teeth and a teeth depth suited for cutting at least one of metal, plastic, wood, or drywall.

21. The multi-edge saw blade of claim 1, wherein the first cutting edge and the at least one additional cutting edge each have rows of teeth having a number of teeth and a teeth depth suited for cutting at least one of a food product or a material relevant to a medical application.

22. The multi-edge saw blade of claim 1, wherein the attachment socket is one of a universal socket, a starlock socket, or a supercut socket.

23. The multi-edge saw blade of claim 1, wherein each of the perforations defines, in part, at least two connection elements.

24. The multi-edge saw blade of claim 23, wherein the at least two connection elements define a space of the perforation.

25. The multi-edge saw blade of claim 24, wherein a tooth of the additional row of cutting teeth protrudes into the space.

26. The multi-edge saw blade of claim 25, wherein each of the at least two connection elements connect to the tooth.

27. The multi-edge saw blade of claim 26, wherein each of the at least two connection elements are structured to break at a most narrow portion of the connection element.

* * * * *